(12) United States Patent
Lee

(10) Patent No.: US 10,949,897 B2
(45) Date of Patent: Mar. 16, 2021

(54) SYSTEM AND METHOD FOR RECEIVING PROMOTIONAL SAMPLE PRODUCT

(71) Applicant: Sanghyub Lee, Gyeonggi-do (KR)

(72) Inventor: Sanghyub Lee, Gyeonggi-do (KR)

(73) Assignee: Sanghyub Lee, Gyeonggi-do (KR)

( * ) Notice: Subject to any disclaimer, the term of this patent is extended or adjusted under 35 U.S.C. 154(b) by 0 days.

(21) Appl. No.: 16/641,957

(22) PCT Filed: Aug. 27, 2018

(86) PCT No.: PCT/KR2018/009881
§ 371 (c)(1),
(2) Date: Feb. 25, 2020

(87) PCT Pub. No.: WO2019/039924
PCT Pub. Date: Feb. 28, 2019

(65) Prior Publication Data
US 2020/0320581 A1 Oct. 8, 2020

(30) Foreign Application Priority Data
Aug. 25, 2017 (KR) .......................... 10-2017-0108247

(51) Int. Cl.
*G06Q 30/00* (2012.01)
*G06Q 30/02* (2012.01)
*G06K 19/06* (2006.01)

(52) U.S. Cl.
CPC ......... *G06Q 30/0277* (2013.01); *G06K 19/06* (2013.01); *G06Q 30/0236* (2013.01); *G06Q 30/0248* (2013.01); *G06Q 30/0257* (2013.01); *G06Q 30/0267* (2013.01); *G06Q 30/0273* (2013.01)

(58) Field of Classification Search
CPC .......... G06Q 30/0277; G06Q 30/0248; G06Q 30/0257; G06Q 30/0267; G06Q 30/0273; G06Q 30/02; G06K 19/06
See application file for complete search history.

(56) References Cited

U.S. PATENT DOCUMENTS

| | | | | |
|---|---|---|---|---|
| 7,624,038 B1 * | 11/2009 | Wood | ................. | G06Q 30/0225 705/14.39 |
| 7,925,531 B1 * | 4/2011 | Cunningham | ......... | G06Q 10/10 705/14.1 |
| 8,577,345 B2 * | 11/2013 | Dragt | .................... | G06Q 30/02 455/414.2 |
| 8,677,391 B2 * | 3/2014 | Tanaka | ............... | H04N 21/4627 725/32 |

(Continued)

*Primary Examiner* — Luis A Brown
(74) *Attorney, Agent, or Firm* — IP & T Group LLP

(57) ABSTRACT

A system and method for receiving a promotional sample product, which can enable an advertiser to check whether a sample product, provided by the advertiser, is accurately delivered to a customer, thereby securing the reliability of means for seeking exposure advertisement by providing samples, and maximizing the promotion effects.

A system for receiving a promotional sample product includes: a sample receiving relay server; an advertiser terminal; a customer terminal; and a sample processing terminal. The sample receipt app generates only one authentication key per customer ID in order to prevent duplicated samples from being provided for one customer ID.

28 Claims, 19 Drawing Sheets

(56) References Cited

U.S. PATENT DOCUMENTS

| | | | |
|---|---|---|---|
| 8,930,986 B2* | 1/2015 | Tanaka | H04N 21/47214 |
| | | | 725/32 |
| 2004/0254836 A1* | 12/2004 | Emoke Barabas | G06Q 30/02 |
| | | | 705/14.35 |
| 2006/0167820 A1* | 7/2006 | Jeong | G06Q 30/02 |
| | | | 705/67 |
| 2008/0221986 A1* | 9/2008 | Soicher | G06Q 30/0258 |
| | | | 705/14.36 |
| 2009/0248520 A1* | 10/2009 | Ku | G06Q 30/0603 |
| | | | 705/14.39 |
| 2010/0121715 A1* | 5/2010 | Shiojima | G06Q 30/0257 |
| | | | 705/14.55 |
| 2010/0325646 A1* | 12/2010 | Alhadeff | G06Q 30/02 |
| | | | 725/10 |
| 2012/0055984 A1* | 3/2012 | Van Megchelen | G06Q 30/02 |
| | | | 235/375 |
| 2014/0089068 A1* | 3/2014 | Yehezkel | G06Q 30/0217 |
| | | | 705/14.19 |
| 2014/0100942 A1* | 4/2014 | Konevic | H04L 67/34 |
| | | | 705/14.37 |
| 2020/0320581 A1* | 10/2020 | Lee | G06K 19/06 |

* cited by examiner (FIG.4A)
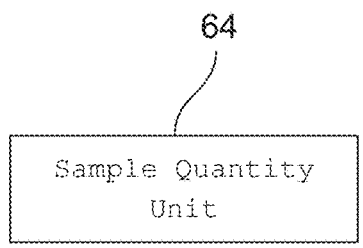
(FIG.4B)
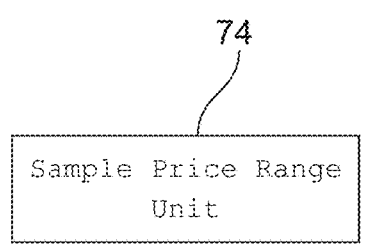
(FIG.4C)
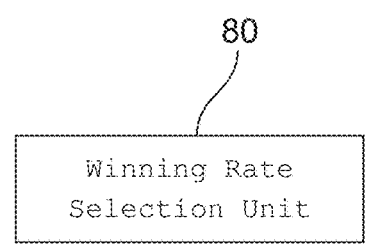

SYSTEM AND METHOD FOR RECEIVING PROMOTIONAL SAMPLE PRODUCT

This application is a national stage application of PCT/KR2018/009881 filed on Aug. 27, 2018, which claims priority of Korean patent application number 10-2017-0108247 filed on Aug. 25, 2017. The disclosure of each of the foregoing applications is incorporated herein by reference in its entirety.

TECHNICAL FIELD

The present disclosure relates to a system and method for receiving a promotional sample product, which can enable an advertiser to check whether a sample product (including freebee), which is provided by the advertiser to promote a shopping mall or company or an organization such as a gathering or club or to advertise a new product, is accurately delivered to a customer, and more particularly, to a system and method for receiving a promotional sample product, which can improve an advertisement reach rate by accurately delivering a sample product, provided by an advertiser, to a customer through a receipt confirmation app, prevent duplicated sample products from being received by one customer, and expand the opportunities that the customer can recognize information of an organization or encounter information of a new product, while receiving a sample for free.

BACKGROUND ART

With the rapid development of the industry, various products that attract customers' eyes are distributed on the market. It is known that exposure advertisements have the maximum effect as advertisements for promoting new products. Such exposure advertisements are placed through various media channels or portal sites. Recently, the exposure advertisements are placed through social networks such as SNS, and viral marketing is conducted using sample products in some cases. With the development of the Internet, clubs or non-profit organizations for sharing hobbies or knowledge among people are formed one after another, and promoted through various means such as sample products in order to increase the number of members.

In particular, promotion marketing is conducted through an event in which samples are provided for free, in order to promote new products manufactured by manufacturing companies or new companies such as shopping malls or offline shops. Since the awareness of a product or company has a direct influence on sales, many companies promote their products through exposure advertisements at large expense.

Providing free sample products to customers is a main method for causing the customers to preferentially select specific products in place of competitive products. Typically, as a method for providing free sample products, free sample products may be included in newspapers or other printed materials and directly put into customers' mailboxes, or promotion staffs may randomly provide sample products to customers in a crowded place such as a shopping center. As another method, a clerk at a counter of a supermarket or store may provide a sample product to a customer in consideration of the type of a product purchased by the customer.

The method of distributing free samples to customers has advantages in that main products can be exposed a lot to customers, and customers can use new products in person. However, the method has a disadvantage in that it has a narrow promotion range. Therefore, such a method is typically used for local advertisements, and locally used in many cases.

Such a conventional method that directly distributes free samples to customers or distributes samples together with products is conducted even at present. However, the conventional method is very inefficient and expensive in advertisers' positions. Since the method of providing samples is only a temporary method, the samples may not be directly propagated to specific consumers who are interested in purchasing products. Furthermore, since the samples are randomly distributed, the samples may be provided to consumers who do not want the products. Thus, a large promotional effect may not be obtained through the samples.

Furthermore, a method of directly distributing samples with print flyers to passers-by may be used. In this case, since an advertiser has a limitation in providing free samples to customers in person, the advertiser collects part-time workers who will provide service to distribute samples. However, since a part-time worker is paid per hour or paid for the quantity of samples distributed by the part-time worker, the samples may not be reliably delivered to target customers. Also, since the advertiser cannot monitor how the part-time workers handle the samples, the advertiser may not obtain an effect against time and cost. Furthermore, since the promotion area is limited, a satisfactory promotion effect may not be obtained.

In order to conduct advertising across a wide area instead of such an inefficient and conventional sample providing method, promotion is attempted through keyword advertisements using various portal sites, blogs or cafes, or attempts to provide promotional samples are made through SNS such as FaceBook, Twitter, Kakao Story or Line. However, this is only a target advertisement using information on customers who have been connected in business dealings, and has difficulties in providing sample products to many and unspecified persons.

In the existing cases, a method of distributing sample products through offline shops or a method of separately delivering sample products after user information is registered on-line through the Internet or the like has been used in order to promote products through sample products. Therefore, a company with no offline shops inevitably relied on sample product delivery through an online service. When the sample product delivery through the online service is used, a user can receive a sample product in a specific time only after sample product delivery was requested, and a delivery cost is generated. Thus, it is impossible to provide sample products with immediacy. Furthermore, since promotions for new products have different advertisement effects depending on brand awareness, it is very difficult for small and medium-sized enterprises to promote new products.

DISCLOSURE

Technical Problem

Various embodiments are directed to a system and method for receiving a promotional sample product, which can enable an advertiser to check whether a sample product, which is provided by the advertiser to promote an organization or start-up company, a new product, contents and the like, is accurately delivered to a customer, thereby securing the reliability of means for seeking exposure advertisement by providing samples, and maximizing the promotion effects.

Also, various embodiments are directed to a system and method for receiving a promotional sample product, which can propagate advertisement contents and sample products, provided by an advertiser, to a customer at the same time, and simultaneously improve an advertisement reach rate.

Further, various embodiments are directed to a system and method for receiving a promotional sample product, which provides a sample receipt app with a notice function through which sample products can be received for free, such that a customer can frequently receive sample products, and promote advertisement contents of an advertiser to many and unspecified persons regardless of areas.

Further, various embodiments are directed to a system and method for receiving a promotional sample product, which can prevent duplicated sample products from being delivered to a customer.

Further, various embodiments are directed to a system and method for receiving a promotional sample product, which can enable a customer to recognize a sample providing place, registered by an advertiser, around a current location through a sample receipt app.

Technical Solution

In an embodiment, a system for receiving a promotional sample product may include: a sample receiving relay server configured to receive sample product information and advertisement contents from an advertiser, provide the advertisement contents to a customer when a sample receipt request is received from the customer, generate an authentication key, provide the generated authentication key to the customer, and provide an authentication result to a sample receipt place according to a confirmation request for the authentication key, transmitted from the sample receipt place; an advertiser terminal configured to connect to the sample receiving relay server to input the advertisement contents desired by the advertiser and information on the quantity of sample products; a customer terminal configured to connect the customer terminal and the sample receiving relay server through a network, connect to the sample receiving relay server to download the advertisement contents for sample receipt, and receive an authentication key (pin number), which is used to authenticate whether the advertisement contents watched by the customer have been completely received, from the sample receiving relay server, and including a medium for generating an advertisement contents receipt completion authentication key; and a sample processing terminal configured to transmit the authentication key provided from the customer terminal to the server, and including a manager app for receiving an authentication result transmitted from the server in order to provide a sample to the customer. The sample receipt app may generate only one authentication key per customer ID, in order to prevent two or more samples from being provided for one customer ID.

In an embodiment, an method for receiving a promotional sample product may include: a first step of connecting, by an advertiser terminal, to an advertisement request unit and requesting advertisement, in order to provide a promotional sample; a second step of uploading information associated with the advertisement into a sample product menu and an advertisement contents menu, which are included in the advertisement request unit; a third step of depositing a preset amount of money according to the quantity of samples to be provided; a fourth step of downloading, by a customer terminal, a sample receipt app which includes a QR code recognition module for reading information of a product, a received advertisement sorting unit for displaying advertisements received by a customer, an authentication key generation unit for generating an authentication key as the customer checks advertisement contents, a promotion location notice unit for providing a promotion location around the location of the customer, and a sample receipt place program for providing the location of a place where the customer receives a sample product; a fifth step of executing, by the customer terminal, the sample receipt app, scanning a digital recognition code printed on a product, and transmitting the digital recognition code to a sample receiving relay server; a sixth step of providing, by the sample receiving relay server, advertisement contents to the customer terminal, and inducing the customer to watch the advertisement contents; a seventh step of receiving an authentication key from the sample receiving relay server after the advertisement contents are displayed, generating a digital recognition code, and providing the generated digital recognition code to the customer terminal; an eighth step of offering the authentication key and the digital recognition code, provided to the customer terminal, to a sample processing terminal; a ninth step of downloading, by the sample processing terminal, a manager app which includes a sample list to be provided to the customer, a barcode scanner for receiving a barcode offered by the customer, a manual input unit for inputting the barcode offered by the customer when the barcode is not normally recognized, a provided sample list for checking samples which have been provided up to now, and a sample-to-provide list for checking samples to be provided to the customer in the future; a tenth step of executing the manager app of the sample processing terminal to read the authentication key and the digital recognition code, offered by the customer, and transmitting the authentication key and the digital recognition code to the sample receiving relay server; and an 11th step of providing a sample product to the customer according to an authentication result transmitted from the sample receiving relay server. The authentication key may b allocated to only one ID.

Advantageous Effects

The system and method in accordance with the embodiments of the present disclosure have the following effects.

First, the system and method enable a customer to receive a sample product from a sample providing place through an authentication process with a sample check app, which makes it possible to assure an advertiser that a sample is accurately delivered to a customer, while preventing duplicated sample products from being delivered to customer. In particular, since a sample is reliably delivered to a customer, the advertiser does not need to provide samples in person, and may not employ a staff who provides samples.

Second, since a customer visits a sample providing place in person and receives a sample through the system, samples can be distributed regardless of areas and places, which makes it possible to reduce personnel expenses or time.

Third, the system and method can enable an advertiser to progress an age-specific target advertisement through sample products by limiting the sample products for each area, place or winning rate.

Fourth, a customer can frequently receive a sample product for free, and a sample is provided to the customer after the customer watches an advertisement through a procedure executed by a sample receipt app, which makes it possible to achieve an advertisement reach rate of 100%.

Fifth, since a customer needs to carefully watch advertisement contents to receive a sample product, a satisfactory effect can be obtained for an advertisement for a new product as well as an exposure advertisement for promotion of a start-up company or an organization such as a club, shopping or cafe.

Sixth, in the case of a sample providing place which is not a franchise store but a general store, many customers visit the store to receive samples through the sample receipt app, which makes it possible to improve a purchasing rate for other products.

BRIEF DESCRIPTION OF DRAWINGS

FIG. 4A to 4C are diagrams illustrating detailed configurations of the components illustrated in FIG. 3, wherein FIG. 4A is a diagram illustrating a sample quantity unit, FIG. 4B is a diagram illustrating a sample price range unit, and FIG. 4C is a diagram illustrating a winning rate selection unit.

MODE FOR INVENTION

Figure 1:
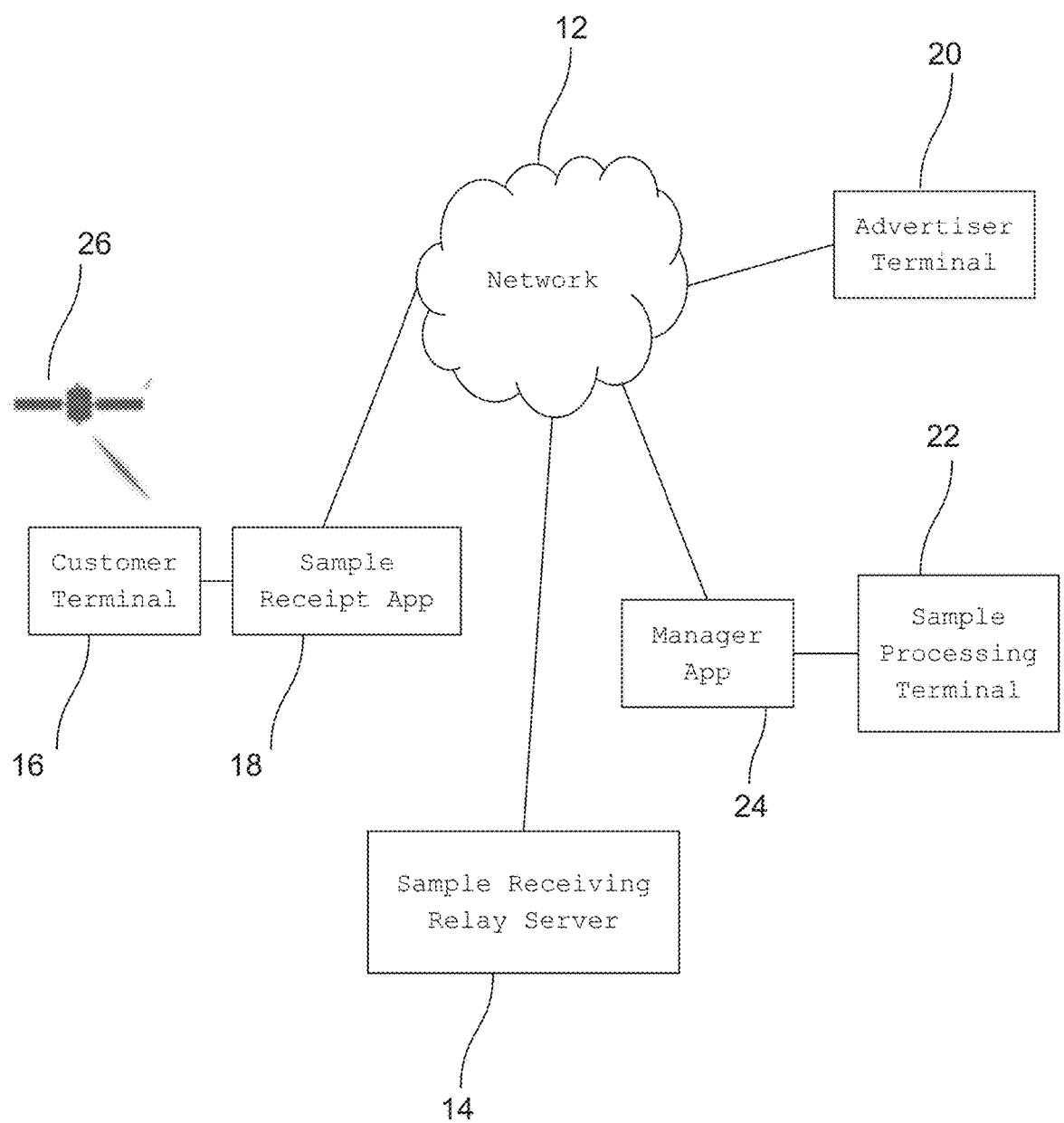
FIG. 1 is a conceptual view illustrating a system for receiving a promotional sample product in accordance with an embodiment of the present disclosure.

Specific features and other advantages of a system and method for receiving a promotional sample product in accordance with an embodiment of the present disclosure will be clarified through descriptions of preferred embodiments with reference to FIGS. 1 to 19.

The system and method for receiving a promotional sample product in accordance with the embodiment of the present disclosure is implemented to enable an advertiser to check through a relay system that a sample product provided by the advertiser is accurately delivered to a customer, and to prevent duplicated sample products from being delivered to one customer. Thus, the system and method can reliably distribute sample products and maximize an advertisement reach rate to improve the advertisement effect. Furthermore, the system and method can expand the opportunities that customers can encounter advertisements while frequently receiving free sample products all over the place.

Before preferred embodiments of the present disclosure are described, an advertiser and a sample product may be defined as follows.

First, examples of the advertiser may include a company which develops and manufactures a product, an organization such as a profit corporation or non-profit corporation, a club, cafe or blog which collects member through SNS (Social Networks System) serving as an online service to construct a relation network among people who share a specific interest or activity, a wholesale/retail offline store or shopping mall which distributes products, and a start-up company which advertise a restaurant, convenience store or other businesses. Thus, in the present disclosure, the advertiser does not indicate a specific advertiser, and all companies which need advertisement or promotion are defined as the advertiser.

Sample products may be divided into new product-related samples and promotional samples. That is, when the advertiser is a manufacturing company or an import/export distribution company, the advertiser will provide a customer with a sample obtained by miniaturizing a new product thereof, in order to promote the new product. In addition, when a new product is not suitable as a sample or an organization or start-up company intends to promote the organization or company, the advertiser may select a promotional product at the right price and provide the promotional product to customers. Therefore, since sample products may be changed depending on the character or characteristics of the advertiser, the sample products may be identified with promotional products. The main purpose of the system and method for receiving a promotional sample product in accordance with the embodiment of the present disclosure is to accurately deliver a sample product to a customer and to maximum the effect of an advertisement provided by the advertiser while the samples are provided for free. Therefore, the preferred embodiments will be described based on the advertiser and the sample product which are defined as described above.

FIG. 1 is a conceptual view illustrating a system for receiving a promotional sample product in accordance with an embodiment of the present disclosure.

As illustrated in FIG. 1, the system for receiving a promotional sample product in accordance with the embodiment of the present disclosure includes a network 12, an online-based sample receiving relay server 14, a customer terminal 16, a sample receipt app 18, an advertiser terminal 20, a sample processing terminal 22 including a manager app 24, and a GPS (Global Positioning System) 26 for informing the customer terminal of the current position of a customer and a product receipt place.

More specifically, the network 12 may be a wired or wireless Internet or a core network integrated with a wired public network, a wireless mobile communication network or a portable Internet.

The online-based sample receiving relay server 14 performs a relay service for providing an advertisement or promotion opportunity to an advertiser through the network 12, and providing a sample to a customer while providing advertisement contents to the customer. Furthermore, the sample receiving relay server 14 may further include a customer information database (not illustrated) for storing information of a customer who has downloaded the sample receipt app 18. That is, the sample receiving relay server 14 may provide a processor on a webpage, the processor serving to receive a sample providing request from the advertiser terminal 20, to upload advertisement contents and sample products, and to process a payment for an advertisement request. The sample receiving relay server 14 may provide a series of processes of enabling a customer to watch advertisement contents provided by an advertiser, and perform authentication to manage webpages required for sample types, sample receipt place information and advertisement contents promotion, such that a customer can receive a sample through the sample providing place.

The customer terminal 16 checks the location of a sample providing place through the sample receipt app 18, shows the advertisement contents provided by the advertiser, receives a pin number through an answer to a quiz, and then requests the sample processing terminal 22 to authenticate the pin number, in order to receive a sample.

The sample receipt app 18 downloaded to the customer terminal 16 receives a sample providing place, advertisement contents and quiz information from the sample receiving relay server 14, and includes a video player or image viewer for executing the received information, an authentication code generator for generating a 2D barcode (QR code) or 3D barcode, and a program for member registration. Also, the sample receipt app 18 includes a function of checking the current location of a customer and the location of a sample receipt place which can provide a sample, through the GPS 26.

The sample receipt app 18 may include a QR code scan function. Only when scanning a QR code through the QR code scan function before receiving a sample, a customer can watch the advertisement contents provided by the advertiser.

The advertiser terminal 20 uploads the information of the sample receipt place and the advertisement contents to the sample receiving relay server 14, and requests advertisement through a deposit.

The sample processing terminal 22 manages the quantity of sample products provided from the advertiser. When a customer requests a sample, the sample processing terminal 22 checks an authentication result through communication with the server, and then provides the sample to the customer. In the present embodiment, the sample processing terminal 22 may include a franchise store terminal when the advertiser is a franchise store, and a terminal of a sample distribution place (for example, a convenience store or a market within a building) designated by the server when there is no franchise store.

When a franchise store or sample distribution place uses the sample processing terminal 22, customers will visit the chain store or the sample distribution place to receive samples, and the offline advertisement effect of a product can be obtained through the visits of the customers. When the number of visiting customers is increased, the sales of the product can be increased.

The customer terminal 16, the advertiser terminal 20 and the sample processing terminal 22 are computers such as desktop computers or notebook computers, but are not limited thereto. The customer terminal 16, the advertiser terminal 20 and the sample processing terminal 22 may include all types of wired/wireless communication devices which can connect to the sample receiving relay server 14 through the network and use the two-way sample receiving relay service. For example, the customer terminal, the advertiser terminal and the sample processing terminal may include mobile terminals such as a cellular phone, a PCS (Personal Communication Services) phone and a synchronous/asynchronous IMT-2000 (International Mobile Telecommunication-2000) phone, which communicate through wireless Internet. In addition, the customer terminal, the advertiser terminal and the sample processing terminal may collectively indicate all wired/wireless communication devices, such as a palm PC (Personal Computer), a PDA (Personal Digital Assistant), a smart phone, a WAP (Wireless Application Protocol) phone and a mobile play-station, which have a user interface for connecting to the sample receiving relay server.

In particular, the sample processing terminal 22 has the manager app 24 mounted therein, and may use not only a wireless terminal such as a mobile phone, but also a VAN (Virtual Area Network) connected through the Internet, public network or another dedicated line, a seller management system, a POS (Point of Sale) system, an ARS (Automatic Replying System) and a barcode reader, in order to check an authentication number provided by a customer. The sample processing terminal 22 scans an authentication pin number or QR code (or barcode) offered by the customer, transmits the scanned authentication pin number or QR code to the sample receiving relay server 14, receives an authentication result, and provides a sample to the customer.

Figure 2:
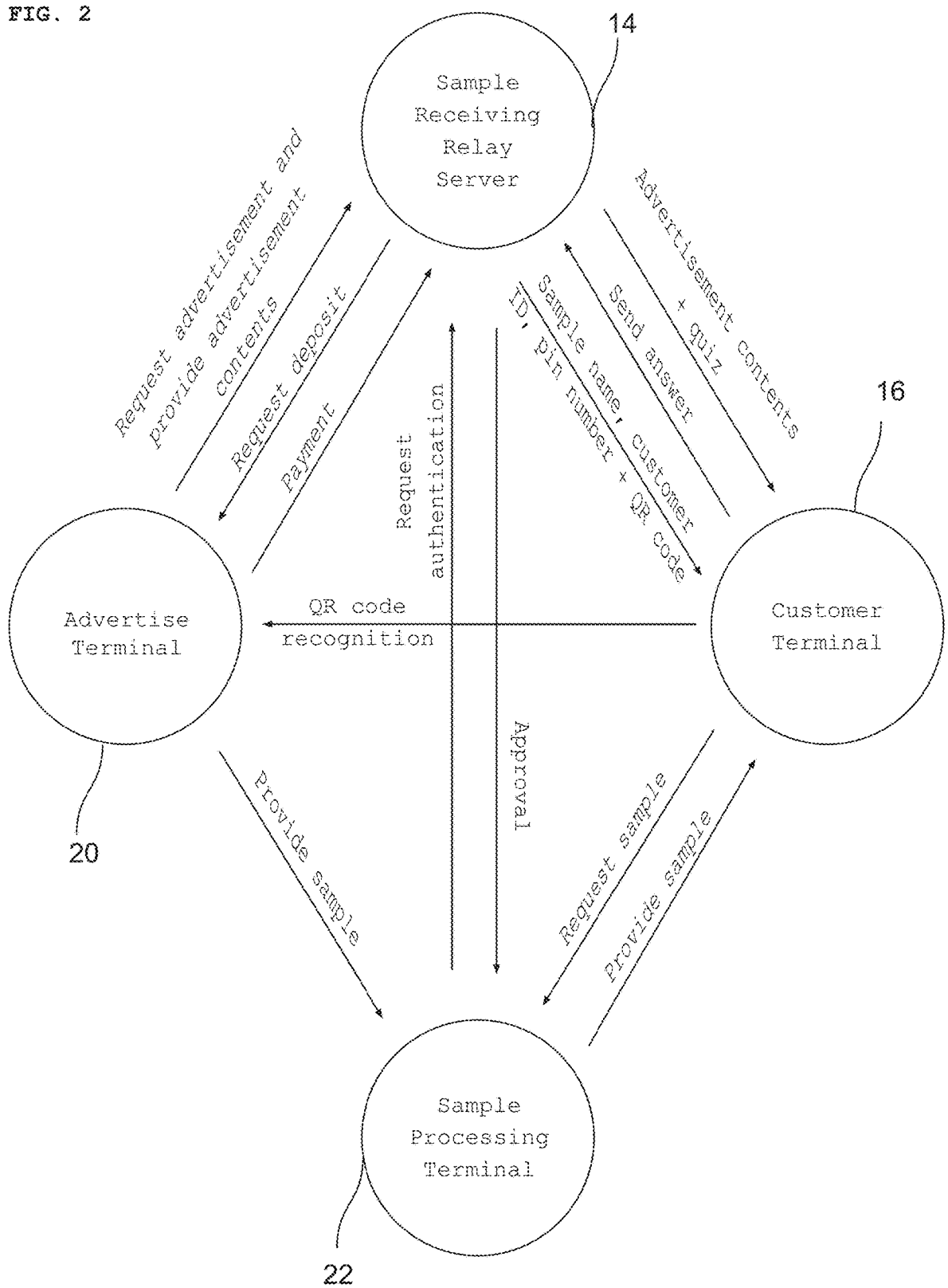
FIG. 2 is a diagram for describing the relationships among a server, an advertiser terminal, a customer terminal and a sample providing terminal in the system for receiving a promotional sample product in accordance with the embodiment of the present disclosure.
Figure 3:
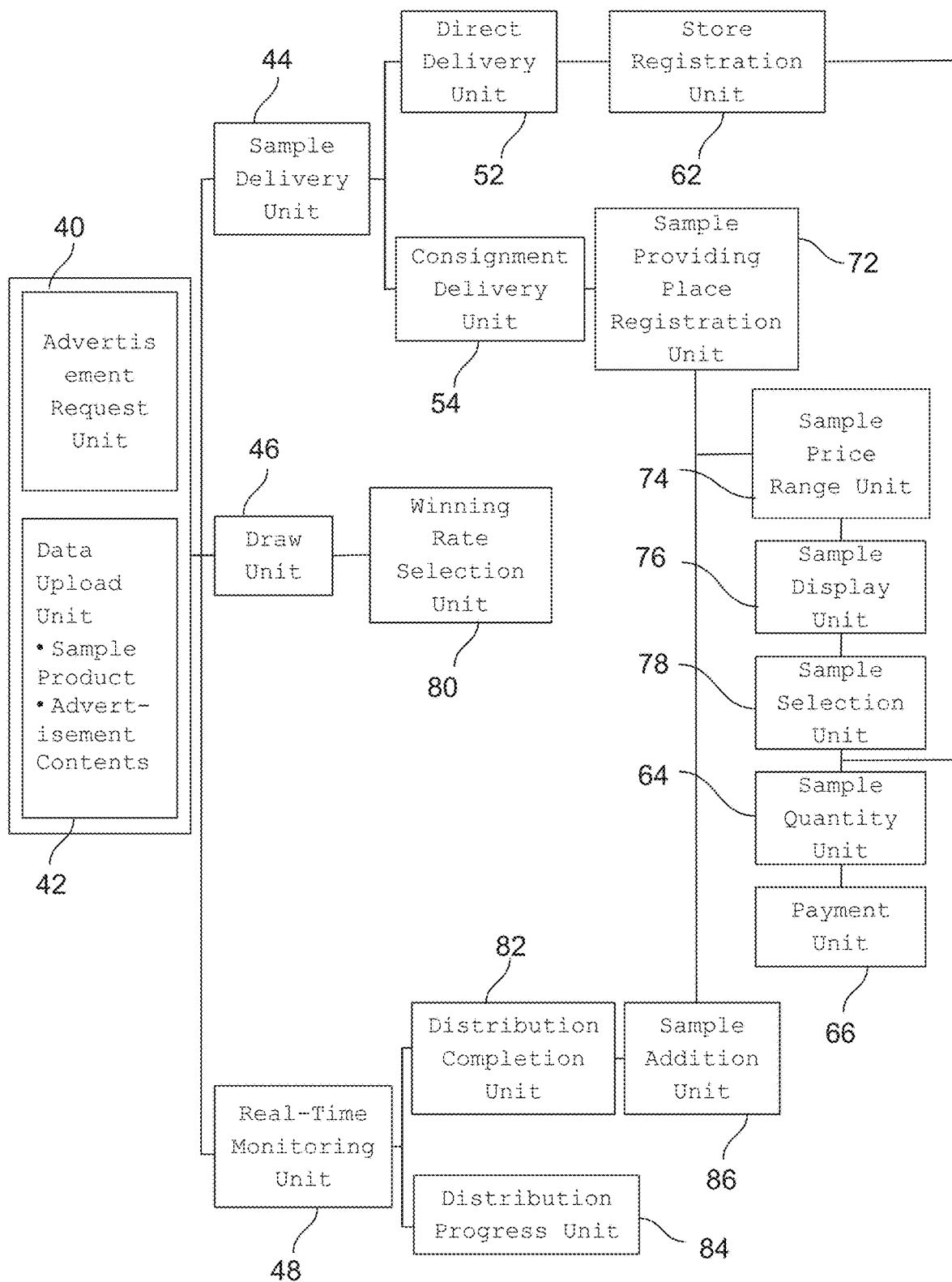
FIG. 3 is a block diagram illustrating an advertisement request system of the advertiser terminal as an example of the system for receiving a promotional sample product in accordance with the embodiment of the present disclosure.
Figure 5:
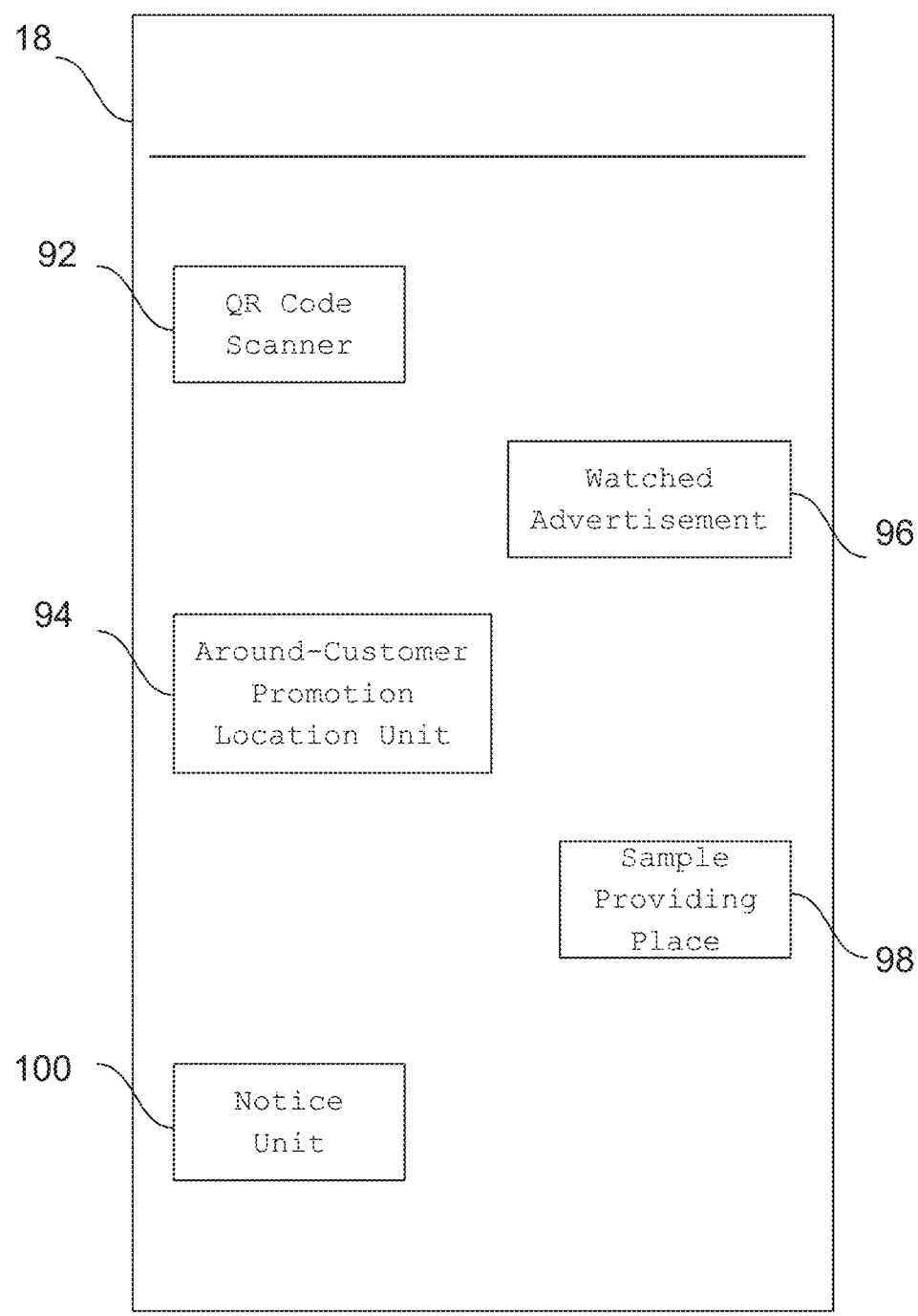
FIG. 5 is a browser screen showing a sample receipt app downloaded to the customer terminal in the system for receiving a promotional sample product in accordance with the embodiment of the present disclosure.
Figure 6:
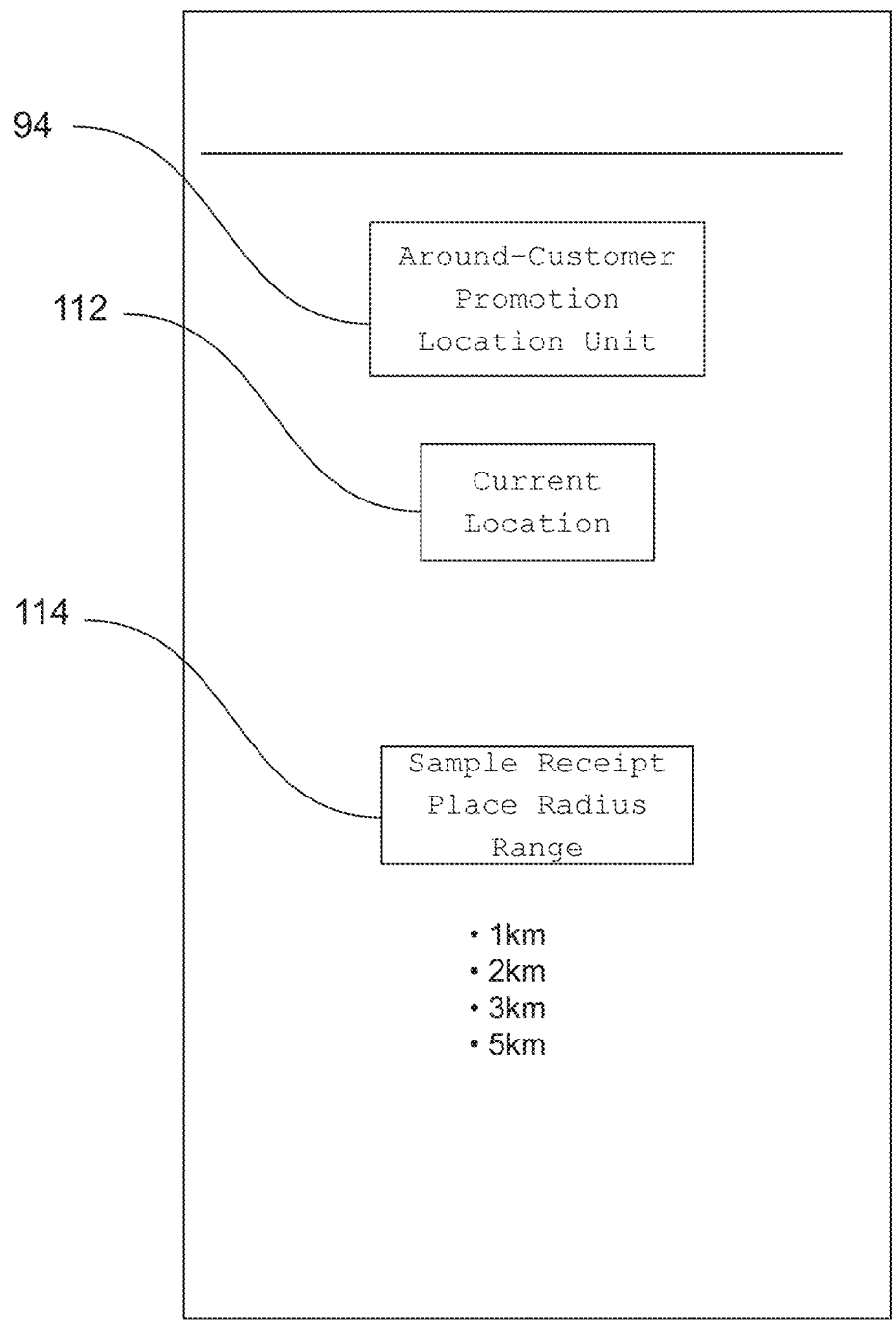
FIG. 6 is a browser screen showing the sample receipt app which displays the current location of a customer and the radius range of a sample providing place in FIG. 5.
Figure 7:
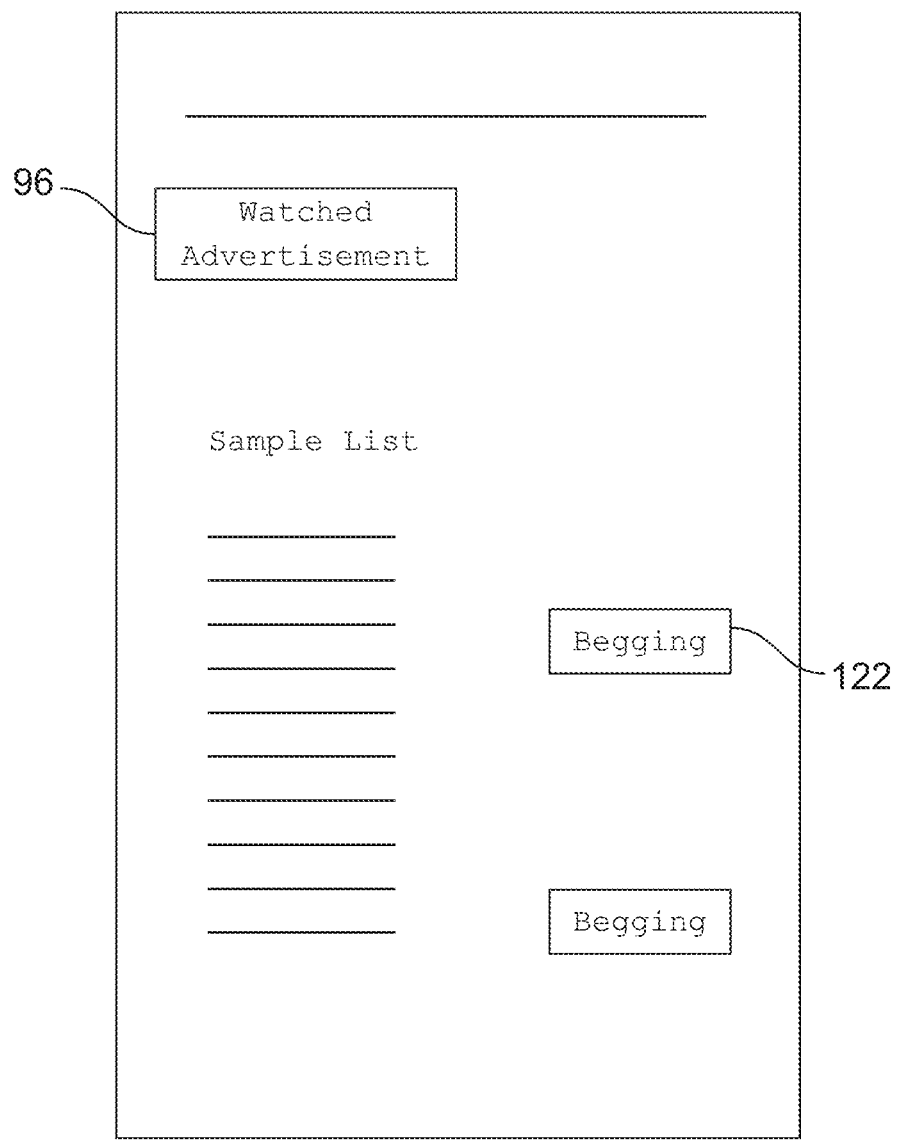
FIG. 7 is a browser screen showing a sample receipt app which displays a sample list and a begging function for a watched advertisement in FIG. 5.
Figure 8:
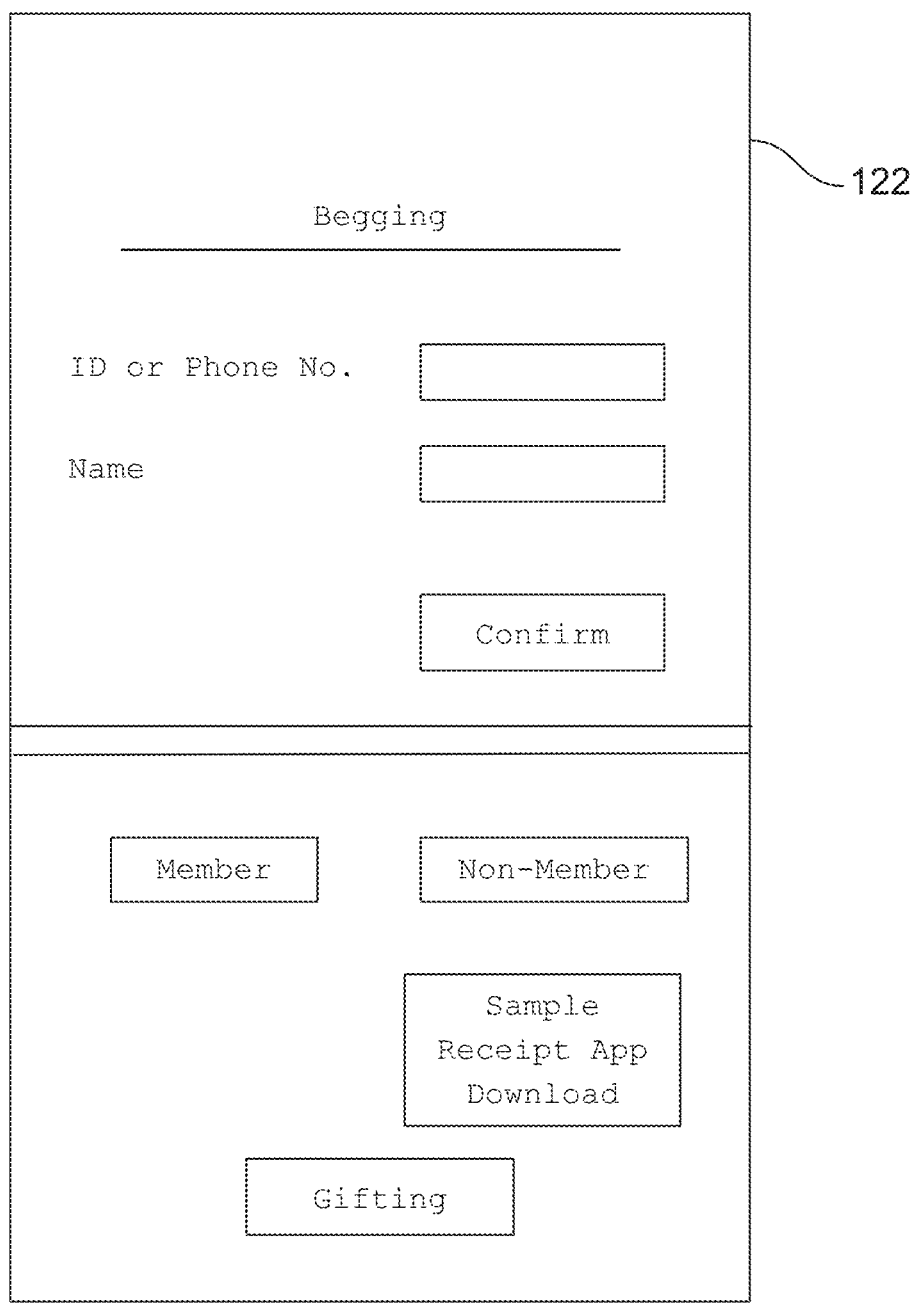
FIG. 8 is a browser screen which is displayed when the begging function is selected in FIG. 7.
Figure 9:
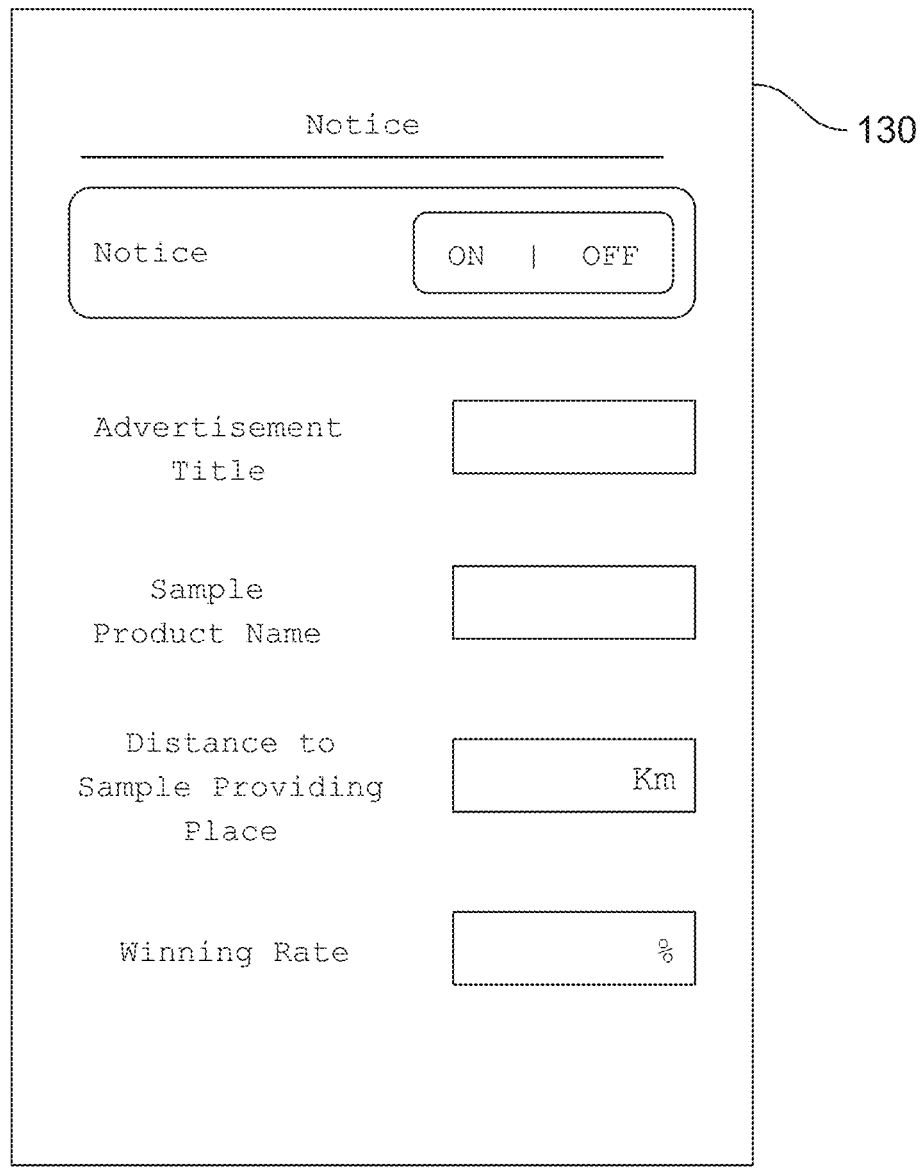
FIG. 9 is a browser screen which is displayed when a notice is selected in FIG. 5.

FIG. 2 is a diagram for describing the relationships among the server, the advertiser terminal, the customer terminal and the sample providing terminal in the system for receiving a promotional sample product in accordance with the embodiment of the present disclosure, FIG. 3 is a block diagram illustrating an advertisement request system of the advertiser terminal as an example of the system for receiving a promotional sample product in accordance with the embodiment of the present disclosure, and FIG. 4A to 4C are diagrams illustrating detailed configurations of the components illustrated in FIG. 3, wherein FIG. 4A is a diagram illustrating a sample quantity unit, FIG. 4B is a diagram illustrating a sample price range unit, and FIG. 4C is a diagram illustrating a winning rate selection unit. FIG. 5 is a browser screen showing the sample receipt app downloaded to the customer terminal in the system for receiving a promotional sample product in accordance with the embodiment of the present disclosure, FIG. 6 is a browser screen showing the sample receipt app which displays the current location of a customer and the radius range of a sample providing place in FIG. 5, FIG. 7 is a browser screen showing a sample receipt app which displays a sample list and a begging function for a watched advertisement in FIG. 5, FIG. 8 is a browser screen which is displayed when the begging function is selected in FIG. 7, and FIG. 9 is a browser screen which is displayed when a notice is selected in FIG. 5.

Referring to FIG. 2, when the advertiser terminal 20 connects to the sample receiving relay server 14, requests advertisement, uploads advertisement contents and sample information data (image and video), and registers a sample providing place, the server 14 transmits a payment request, and the advertiser carries out payment. The sample receiving relay server 14 transmits the advertisement contents, provided by the advertiser, to a customer after the advertiser carries out the payment, receives an answer to a quiz included in the advertisement contents from the customer, and transmits the location of the sample providing place and a chosen pin number to the customer terminal.

The customer terminal 16 downloads the sample receipt app 18 from an app store or a home page through a PC, and displays the location of a sample providing place checked through the GPS 26 on an app browser. Through the customer terminal 16, the customer inputs an answer to a quiz which is provided after the customer watched the advertisement contents, and receives the location of the sample providing place and the pin number from the sample receiving relay server 14. At this time, the sample receipt app 18 may generate a barcode through a barcode generator separately from the received pin number. Therefore, the customer can receive a sample product through a pin number or barcode. In the present embodiment, a place where a customer watches advertisement is typically designated as the sample receipt place. However, the present embodiment is not limited thereto, and a place where a customer watches advertisement may be different from the sample receipt place.

When the pin number or barcode received from the customer terminal 16 is provided to the sample processing terminal 22, the sample processing terminal 22 executes the manager app 24 to input the pin number or barcode corresponding to an authentication key, and requests the sample receiving relay server 14 to authenticate the pint number or barcode. When the authentication result is received from the sample receiving relay server 14, a manager provides a sample product to the customer, and clicks a count (or confirmation) button.

As described above, the detailed configurations of the advertiser terminal 20 and the customer terminal 16 in the series of processing relationships among the server, the customer terminal 16, the advertiser terminal 20 and the sample processing terminal 22 will be described with reference to FIGS. 3 to 9.

As illustrated in FIG. 3, the advertisement request system of the advertiser terminal includes an advertisement request unit 40, a sample delivery unit 44, a draw unit 46 and a real-time monitoring unit 48. The advertisement request unit 40 receives an advertisement request, and includes a data upload unit 42 for uploading sample product information and advertisement contents. The sample delivery unit 44 registers information on a sample distribution place through which the advertiser distributes sample products required for advertisement. The draw unit 46 regulates sample distribution. The real-time monitoring unit 48 enables the advertiser to check the quantity of provided samples. The advertisement contents uploaded by the data upload unit 42 may be video files or images, and include quizzes for customers. In the present embodiment, it has been exemplified that the advertisement contents include quizzes. However, the present embodiment is not limited thereto, and it is well known that quizzes may be excluded from the advertisement contents uploaded by the advertiser.

The sample product information may be a picture file (jpg) configured as an actual picture. In addition, all files which can be opened on the app may correspond to the sample product information.

The sample delivery unit 44 includes a direct delivery unit 52 which helps the advertiser to deliver sample products to a franchise store or chain store in person, and a consignment delivery unit 54 which helps the advertiser to deliver the sample products through the server 14. The direct delivery unit 52 includes a store registration unit 62, a sample quantity unit 64 and a payment unit 66. Through the sample quantity unit 64 and the payment unit 66, an advertisement amount can be set. In the present embodiment, the payment unit 66 may be set to a cost per sample product.

For example, as illustrated in FIG. 4A, the sample quantity unit 64 may classify the quantity of samples into 1,000, 3,000, 5,000, 10,000 and others.

The consignment delivery unit 54 includes a sample providing place registration unit 72 for sample delivery, a sample price range unit 74 through which the advertiser can select a sample in a desired price range, a sample display unit 76 for displaying samples provided in each price range by the sample price range unit 74, and a sample selection unit 78 through which the advertiser selects a displayed sample and which is connected to the sample quantity unit 64.

For example, as illustrated in FIG. 4B, the sample price range unit 74 may classify the price range of the samples into 300 Won, 500 Won, 1,000 Won, 2,000 Won and others.

The draw unit 46 includes a winning rate selection unit 80 for designating the probability that a customer can be randomly chosen when solving a quiz included in the advertisement contents.

As illustrated in FIG. 4C, the winning rate selection unit 80 may set the winning rate to 10%, 25%, 50%, 75% or 100%. Sample providing places registered in the sample receiving relay server 14 through the sample providing place registration unit 72 may be subdivided at national level or for each metropolitan city, each province, each ward or city office or each block, and provided to the advertiser.

The real-time monitoring unit 48 may include a distribution completion unit 82 and a distribution progress unit 84. The real-time monitoring unit 48 may further include a sample addition unit 86 through which samples can be additionally provided when the distribution of the samples is completed. The sample addition unit 86 may be connected to the sample price range unit 74.

As illustrated in FIG. 5, the sample receipt app 18 includes a member registration unit (not illustrated) which is displayed when the sample receipt app 18 is downloaded, a digital recognition module (hereafter, referred to as QR code scanner) 92 for reading information of a product provided by the advertiser, an around-customer promotion location unit 94, a received advertisement sorting unit (hereafter, referred to as 'watched advertisement unit') 96, a sample providing place module 98 and a notice program 100. The QR code scanner module 92 reads a QR code printed on a product promotion material, and receives advertisement contents and a quiz from the sample receiving relay server 14. The around-customer promotion location unit 94 is configured to receive the location of a sample providing place around the current location of the customer through the GPS 26, and inform the customer of the location. That is, as illustrated in FIG. 6, the around-customer promotion location unit 94 includes a current location unit 112 for informing the current location of the customer and a sample receipt place radius range unit 114 for displaying the radius range of a place where the customer wants to receive a sample. In the present embodiment, the sample receipt place radius range unit may classify the radius range into 1 km, 2 km, 3 km and 5 km.

As illustrated in FIG. 7, the watched advertisement unit 96 may include a sample list, and further include a begging function 122 for begging an external member to send a sample product. Specifically, when a customer wants to receive more samples, the customer may beg an external member to send a sample product to the customer through the begging function.

As illustrated in FIG. 8, the begging function 122 may include fields for the ID or phone number and the name of an external member whom the customer intends to beg to send a sample product, and a confirmation button. The person who receives a begging request through the confirmation button is divided into a member and a non-member. When the person is a non-member, the person receives a sample receipt app download message, signs up for membership, and enters a gifting step. When the person is a member, the customer directly enters the gifting step. In the gifting step, the person watches the advertisement and transmits an answer to the quiz. Then, a pin number and a barcode are received, and transmitted to the terminal of the customer who made the begging request. Through such a process, the customer can receive more samples.

FIG. 9 illustrates a notice function 130 mounted on the sample receipt app. The notice function is to propagate sample information to a customer through a notice when the customer is located within a predetermined distance from a sample receipt place or new sample product information is to be propagated to the customer. The notice may include an advertisement title, a sample product name, a distance from the current location of the customer to the sample providing place, and a winning probability. Such a notice function is a push function which automatically informs a user of items or data changed in the app. Since the notice function is publicly known, the detailed descriptions thereof will be omitted herein.

Next, the configuration of the manager app 24 mounted on the sample processing terminal 22 will be described.

Figure 10:
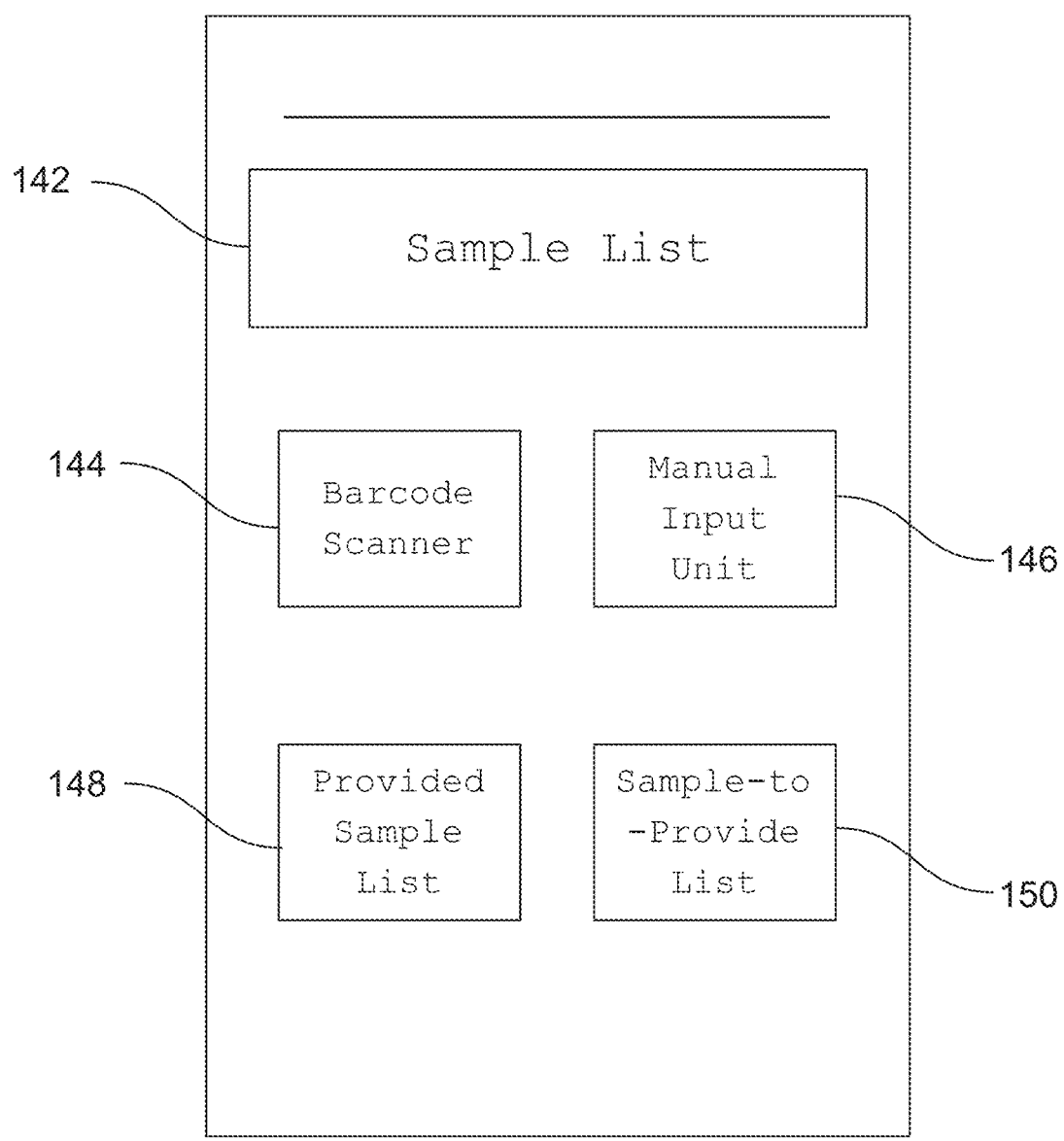
FIG. 10 is a browser screen showing the beginning screen of a sample provider app in a sample processing terminal.
Figure 11:
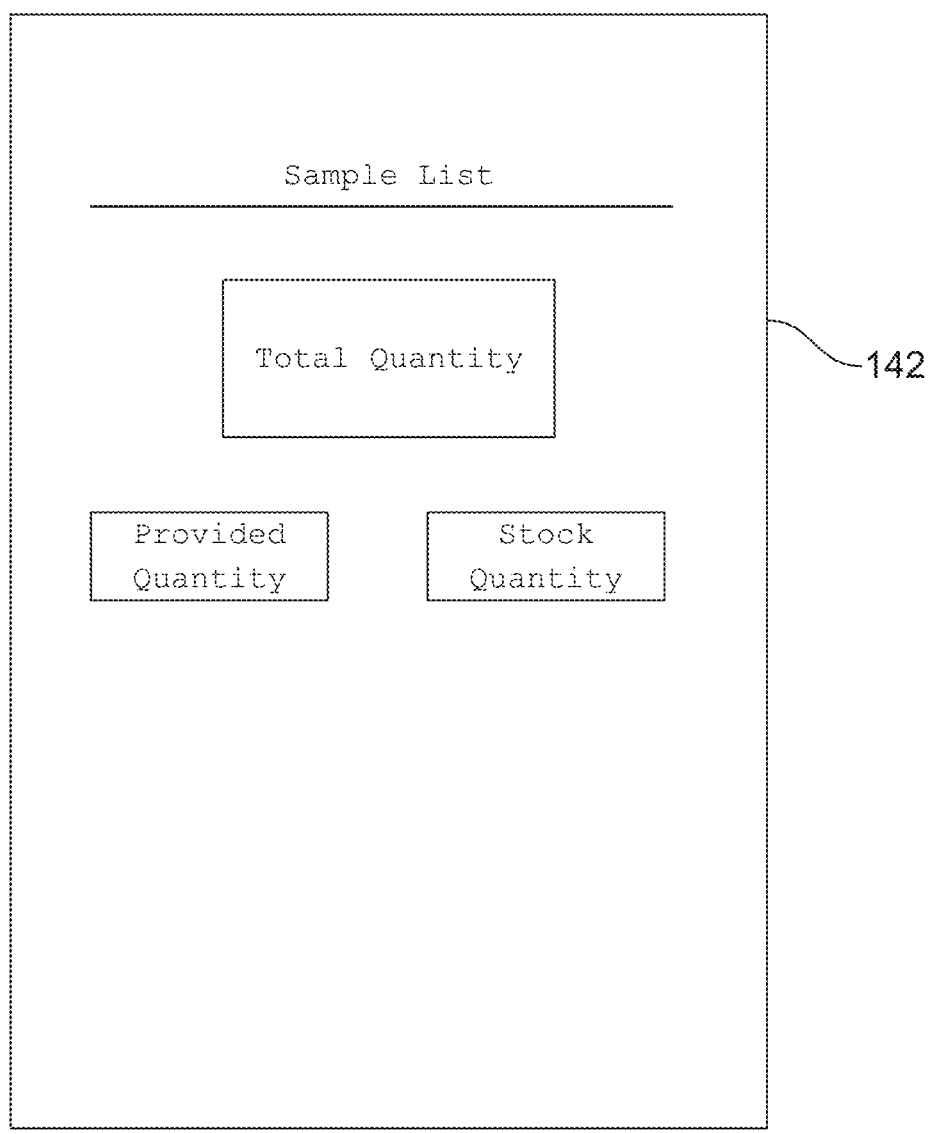
FIG. 11 is a browser screen displaying a total quantity, a provided quantity and a stock quantity for a sample list in FIG. 10.
Figure 12:
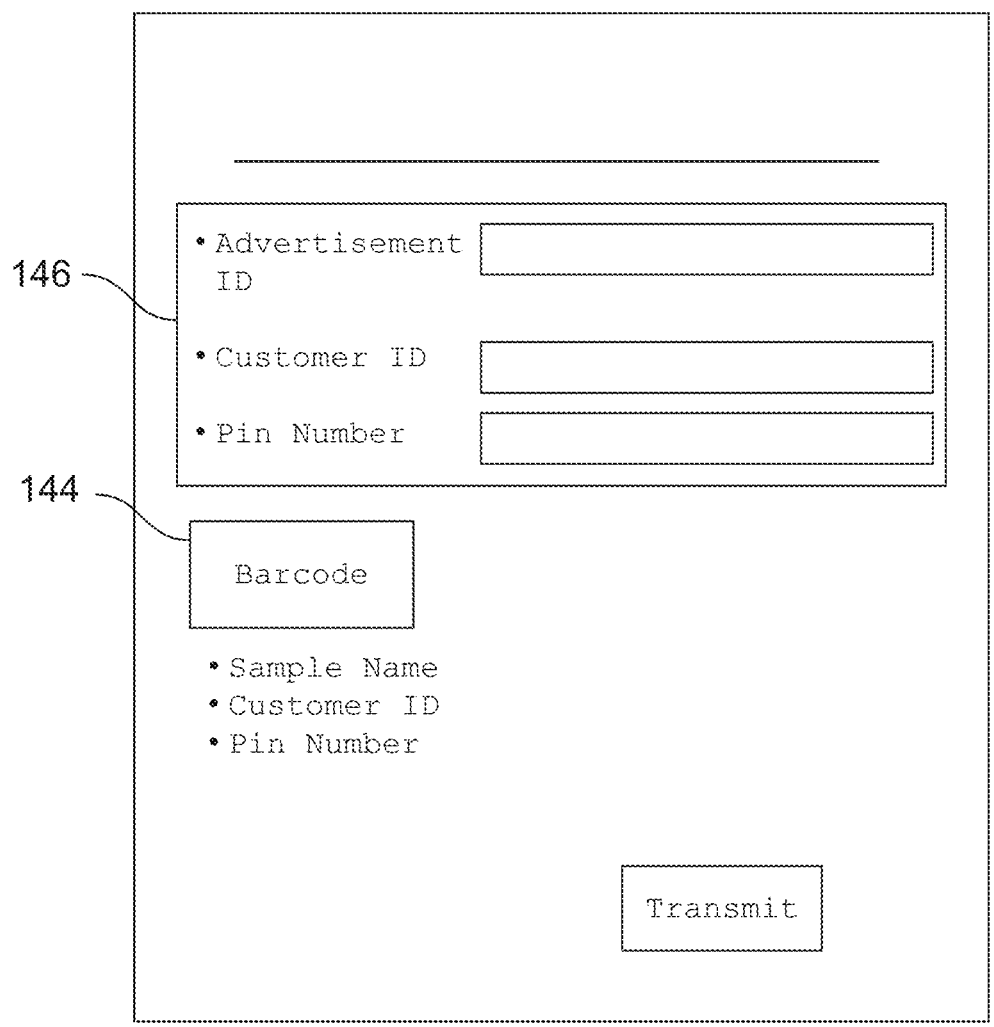
FIG. 12 is a browser screen which displays a barcode and input fields of an advertisement ID, a customer ID and a pin number for sample receipt authentication in FIG. 10.
Figure 13:
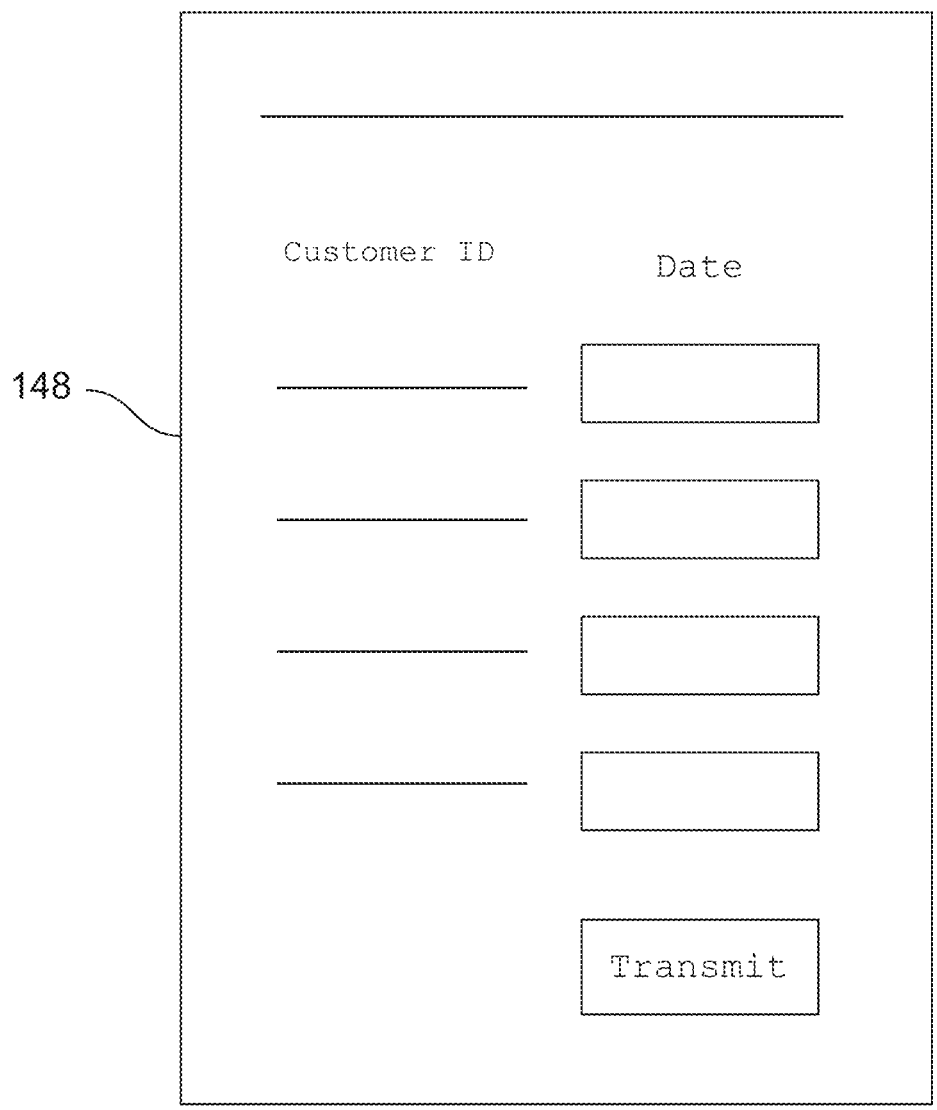
FIG. 13 is a browser screen of a manager app which displays a sample-to-provide list in FIG. 10.
Figure 14:
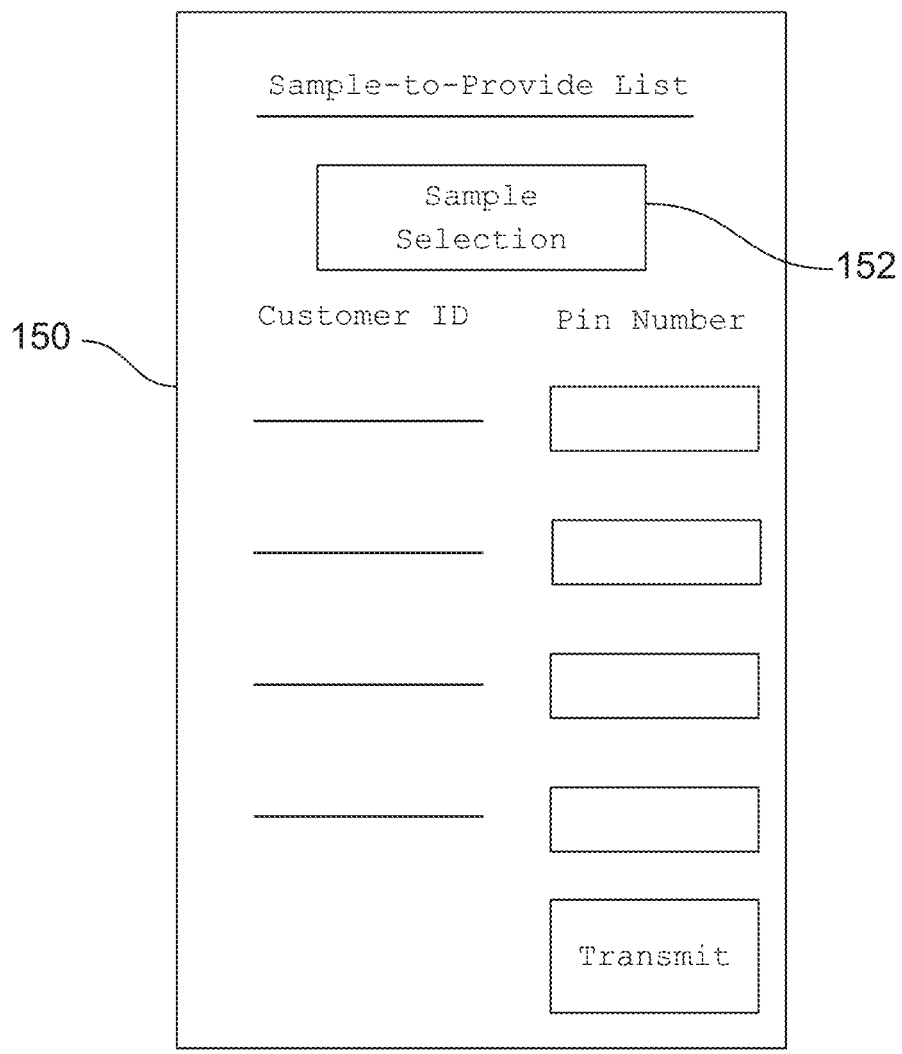
FIG. 14 is a browser screen of a sample provider application which displays a provided sample list in FIG. 10.

FIG. 10 is a browser screen showing the beginning screen of a sample provider app in a sample processing terminal, FIG. 11 is a browser screen displaying a total quantity, a provided quantity and a stock quantity for a sample list in FIG. 10, FIG. 12 is a browser screen which displays a barcode and input fields of an advertisement ID, a customer ID and a pin number for sample receipt authentication in FIG. 10, FIG. 13 is a browser screen of a manager app which displays a sample-to-provide list in FIG. 10, and FIG. 14 is a browser screen of a sample provider application which displays a provided sample list in FIG. 10.

As illustrated in FIG. 10, the beginning screen of the manager app includes a sample list 142 for checking samples to be provided to customers, a barcode scanner 144 for receiving a barcode offered by a customer, a manual input unit 146 for inputting a barcode offered by a customer when the barcode is not normally recognized, a provided sample list 148 for checking samples which have been provided to customers up to now, and a sample-to-provide list 150 for checking samples which are to be provided to customers in the future.

As illustrated in FIG. 11, the sample list 142 may inform a manager of the total quantity, the provided quantity and the stock quantity for each sample product.

As illustrated in FIG. 12, the barcode scanner 144 and the manual input unit 146 are exposed on one screen, and a barcode includes a sample name, a customer ID and a pin number, which are displayed as texts. Through the manual input unit 146, an advertisement ID, a customer ID and a pin number may be inputted. As illustrated in FIG. 13, the provided sample list 148 includes a customer ID and a receipt date, which indicates who received a sample and when the sample was received.

As illustrated in FIG. 14, the sample-to-provide list 150 includes a sample selection unit 152 and fields to which information to be provided in the future, i.e. a customer ID and a pin number for each of samples selected by the sample selection unit 152, can be manually inputted. Therefore, the sample processing terminal 22 may immediately receive a customer ID and a pin number, offered by the customer, transmit the customer ID and the pin number to the sample receiving relay server 14, and receive an authentication result. Then, the manager may provide a sample to the customer after checking the authentication result.

Next, a method for receiving a promotional sample product in accordance with an embodiment of the present disclosure will be described with reference to FIGS. 15 to 18.

Figure 15:
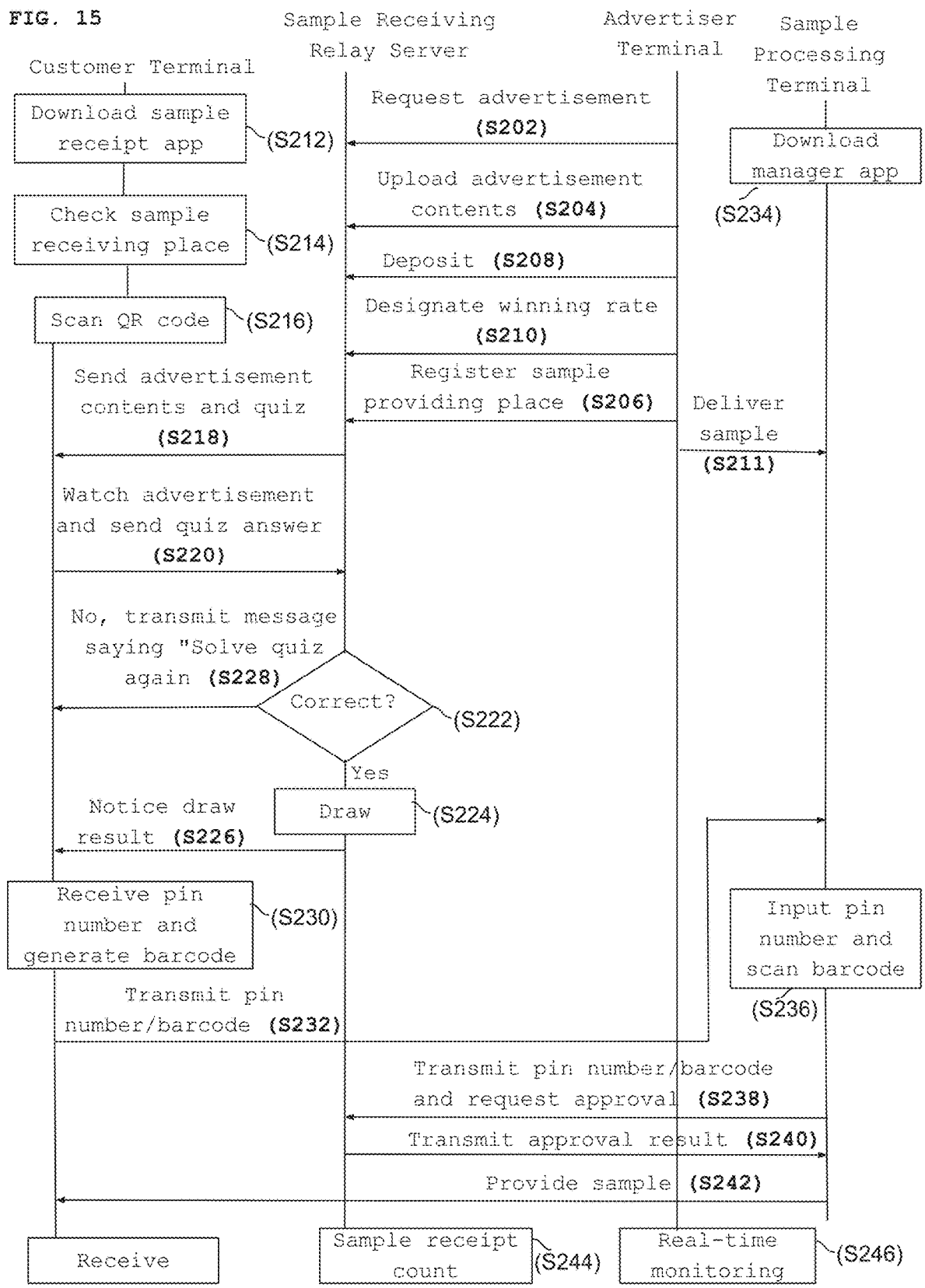
FIG. 15 is an overall flowchart illustrating a method for receiving a promotional sample product in accordance with an embodiment of the present disclosure.

FIG. 15 is an overall flowchart illustrating a method for receiving a promotional sample product in accordance with an embodiment of the present disclosure.

As illustrated in FIG. 15, the method for receiving a promotional sample product in accordance with the embodiment of the present disclosure starts with step S202 in which an advertiser connects to the server through the advertiser terminal 20 and requests advertisement. Then, the advertiser uploads advertisement contents and a quiz included in the advertisement contents to the server in step S204. The advertisement contents can be expressed as digital contents such as a video file or picture file (image) and a flash file. The advertiser registers information of a sample providing place in the server, and deposits an amount of money for advertisement, in step S206 and S208. The advertiser may designate and register a sample winning rate, when requesting advertisement, in step S210. The advertiser delivers sample products to the sample providing place corresponding to the sample processing terminal 22 in step S211. Through the customer terminal, a customer downloads a sample receipt app from an app store and executes the sample receipt app, in step S212. Then, the customer checks a sample receipt place (offline store) through the GPS or a network or map, in step S214. The customer visits an offline store and scans a QR code printed on a promotional material. Then, the server provides the advertisement contents and the quiz to the customer terminal in steps S216 and S218. The customer watches the advertisement through the sample receipt app 18, solves the quiz, and transmits an answer to the server, in step S220. The server 14 determines whether the answer is correct, in step S222. When the answer is correct, the server performs a random draw in step S224. When the customer is chosen through the random draw, the result is noticed to the customer in step S226. When the answer is not correct, a message saying "Solve a quiz again" is transmitted to the customer terminal in step S228. The server transmits a pin number with a winning notice to the customer terminal in step S230. At this time, the customer terminal generates a pin number as a barcode through the barcode generator mounted on the sample receipt app. The customer terminal provides the sample providing terminal with the barcode and the pin number corresponding to an authentication key in step S232. Through the sample processing terminal 22, a manager downloads the manager app in step S234, and receives the sample products from the advertiser. Then, the manager executes the manager app 24 to scan the barcode offered by the customer or to input the pin number, in step S236, and then requests the server to approve the pin number in step S238. The server determines whether to approve the pin number, and transmits the approval result to the manager app of the sample processing terminal, in step S240. The manager provides a sample to the customer according to an approval notice through the sample processing terminal in step S242, and clicks a count button. Then, the server starts sample receipt counting in step S244, and the advertiser can check how many samples have been distributed, through the real-time monitoring unit of the advertiser terminal, in step S246.

Next, the processes of the advertiser terminal, the server, the customer terminal and the sample processing terminal will be described in detail with reference to FIGS. 16 to 19.

Figure 16:
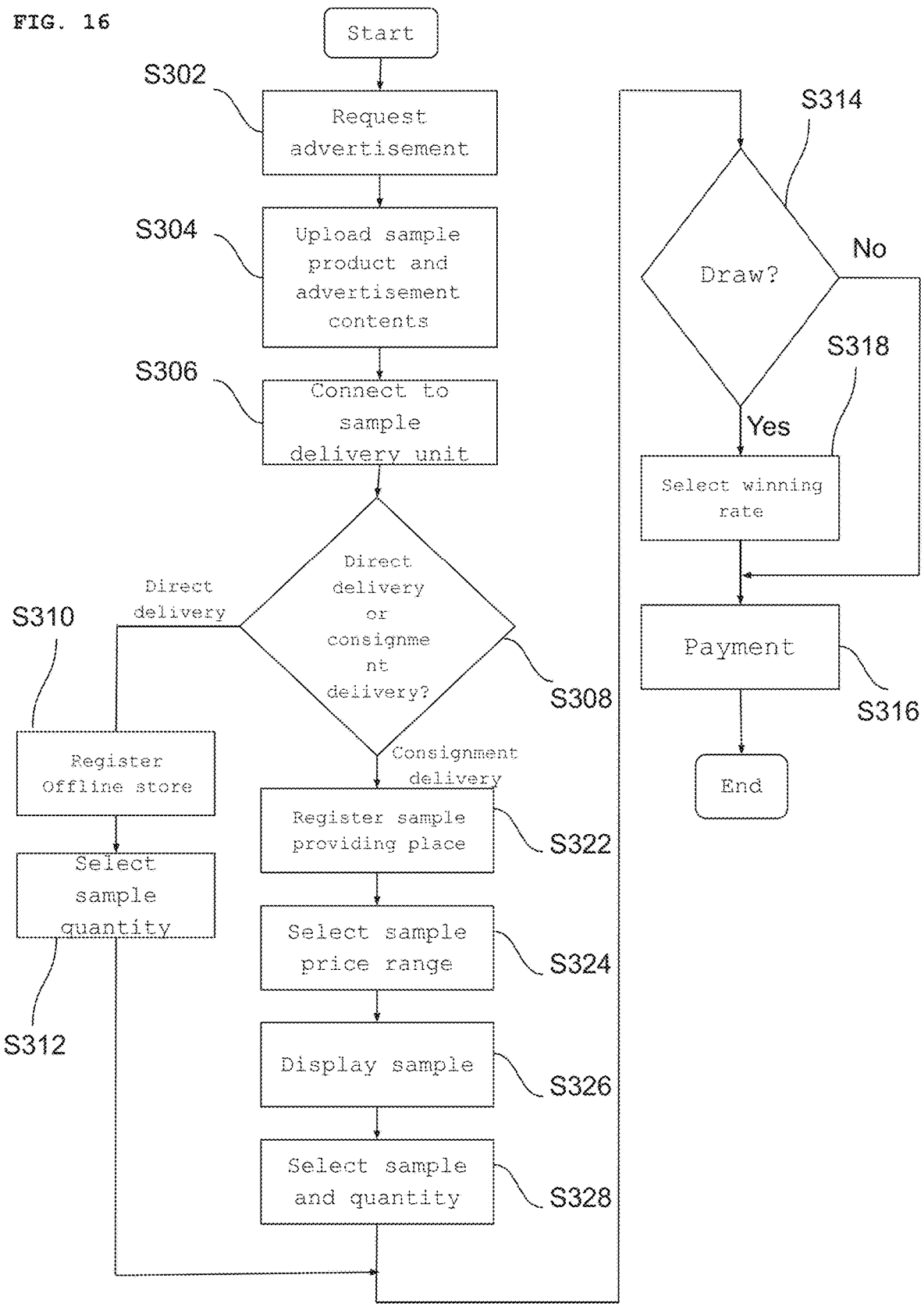
FIG. 16 is a flowchart illustrating a detailed process of an advertiser terminal in the method for receiving a promotional sample product in accordance with the embodiment of the present disclosure.
Figure 17:
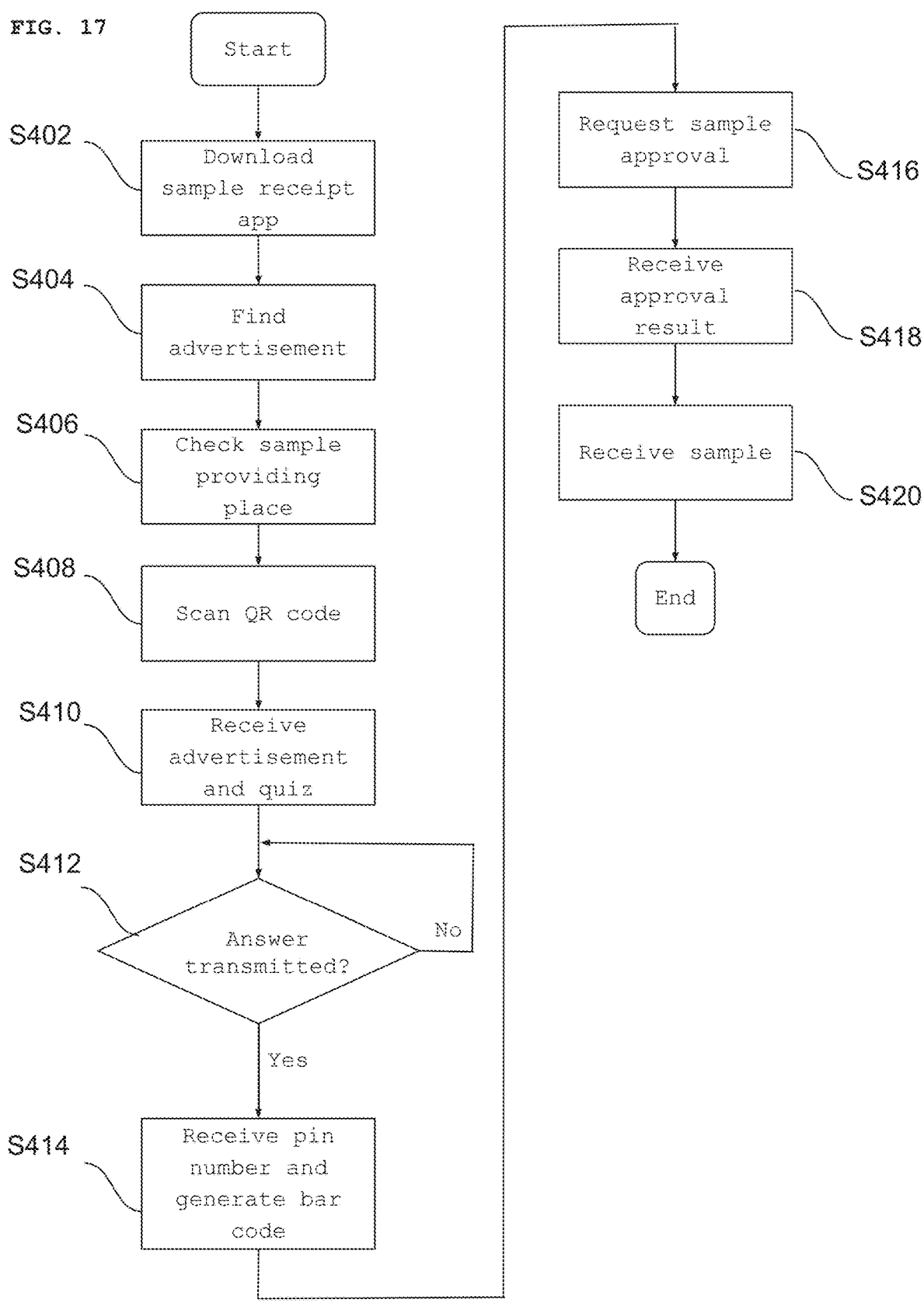
FIG. 17 is a flowchart illustrating a detailed process of a customer terminal in the method for receiving a promotional sample product in accordance with the embodiment of the present disclosure.
Figure 18:
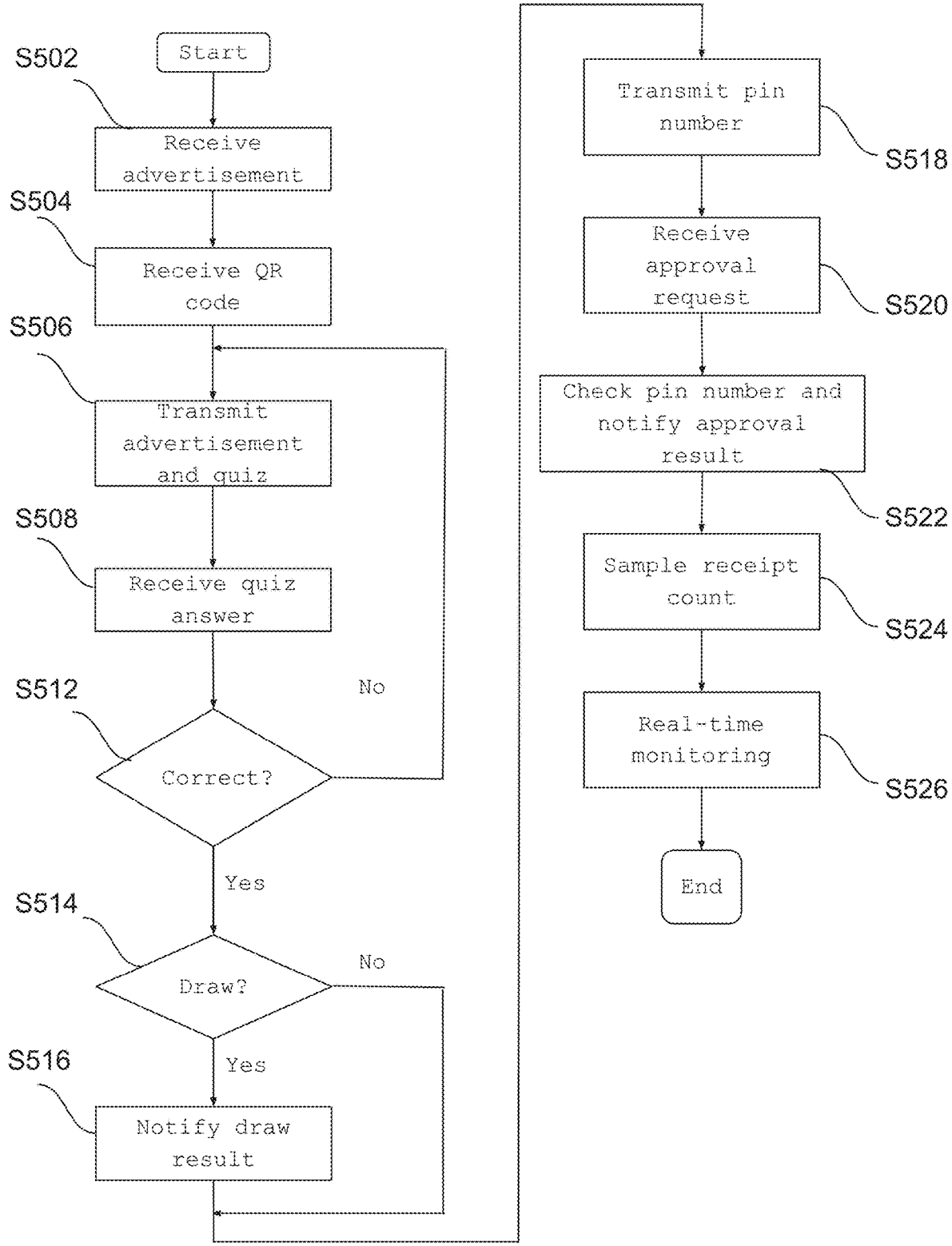
FIG. 18 is a flowchart illustrating a detailed process of a server in the method for receiving a promotional sample product in accordance with the embodiment of the present disclosure.
Figure 19:
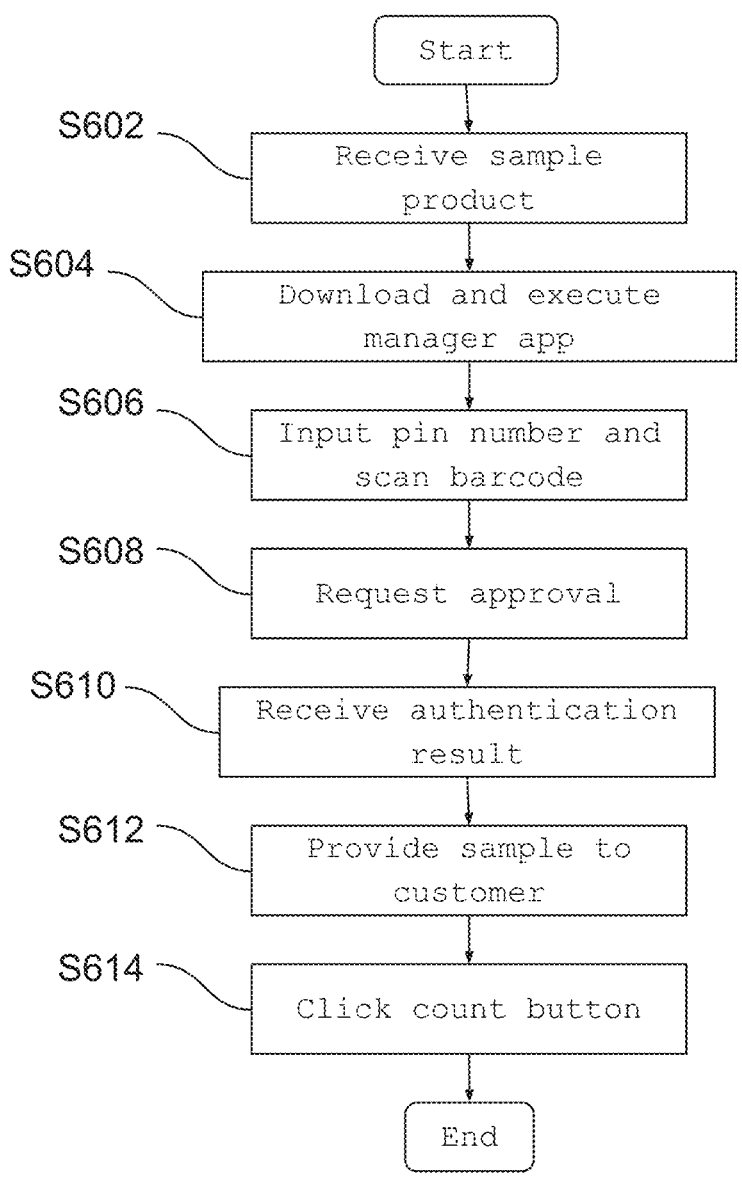
FIG. 19 is a flowchart illustrating a detailed process of a sample providing terminal in the method for receiving a promotional sample product in accordance with the embodiment of the present disclosure.

FIG. 16 is a flowchart illustrating a detailed process of the advertiser terminal in the method for receiving a promotional sample product in accordance with the embodiment of the present disclosure, FIG. 17 is a flowchart illustrating a detailed process of the customer terminal in the method for receiving a promotional sample product in accordance with the embodiment of the present disclosure, FIG. 18 is a flowchart illustrating a detailed process of the server in the method for receiving a promotional sample product in accordance with the embodiment of the present disclosure, and FIG. 19 is a flowchart illustrating a detailed process of the sample providing terminal in the method for receiving a promotional sample product in accordance with the embodiment of the present disclosure.

Referring to FIG. 16, the advertisement request process of the advertiser terminal will be described as follows.

As illustrated in FIG. 16, the advertiser terminal connects to the server to request advertisement through the advertisement request unit, in step S302, and uploads a video file or image associated with the advertisement through the upload unit, in step S304. Then, the advertiser terminal connects to the sample delivery unit to select a delivery method according to the advertiser's intention, in step S306 and S308. Specifically, the advertiser determines whether to deliver samples in person or through consignment delivery. When determining to deliver samples in person, the advertiser registers information (location and telephone number) of an offline store in the server in step S310, and selects the quantity of the samples in step S312. After the step S312, the advertiser determines whether a draw is necessary, through the draw unit, in step S314. When a draw is not necessary, the advertiser deposits an amount of money for the quantity of provided samples, in step S316. When a draw is necessary, the advertiser decides a winning rate through the drawing rate selection unit in step S318, and deposits an amount of money for the quantity of provided samples. Then, the process is ended. The winning rate may be decided according to a probability provided by the advertiser. In the present embodiment, the winning rate may be selected as 10%, 25%, 50% or 75%.

When consignment delivery is selected as the delivery method in step S308, the locations of sample providing places for respective areas, stored in the server, are displayed in step S322, and the advertiser clicks and registers a necessary sample providing place among the sample providing places for respective areas.

The sample providing places stored in the server are subdivided at national level or for each metropolitan city, each province, each ward or city office or each block, and provided to the advertiser. Then, the advertiser selects a sample price in the sample prince range in step S324, and samples in each price range are displayed in step S326. Then, the advertiser selects a sample and the quantity of the samples in step S328, and decides whether a draw is necessary. When a draw is necessary, the advertiser decides a winning rate through the winning rate selection unit, and deposits an amount of money for the quantity of provided samples. Then, the process is ended.

FIG. 17 is a flowchart illustrating a detailed process of the customer terminal. When a customer with the customer terminal downloads the sample receipt app through the app store in step S402 and clicks an advertisement finding menu in step S404, information (address and telephone number) of a sample providing place is displayed on an app browser, such that the customer checks the location of the sample providing place, in step s406. Then, when the customer visits the sample providing place and scans a QR code printed on a sample or a barcode associated with a product in the store in step S408, the customer receives advertisement contents and a quiz from the server through the customer terminal, in step S410. The customer watches the received advertisement contents, and then solves the quiz. When an answer is transmitted in the next step, the server transmits a pin number for sample receipt to the customer terminal, and the sample receipt app generates a barcode and provides the generated bar code to the customer terminal, in steps S412 and S414. Then, the customer terminal transmits a sample approval request to the sample processing terminal in step S416. When the approval result is received in step S418, the customer receives the sample in step S420. Then, the process is ended.

As such, the customer terminal receives the approval through a pin number or a barcode provided by the barcode generator, such that the customer receives the sample. Therefore, since only one sample is provided per customer ID, it is possible to prevent duplicated samples from being provided to one customer ID. When the customer wants to receive more sample products, the customer is induced to watch the advertisement and to solve a quiz, which makes it possible to maximize the advertisement exposure effect.

FIG. 18 is a flowchart illustrating the process of the product receiving relay server. As illustrated in FIG. 18, when an advertisement request is received from the advertiser terminal in step S502, the server is ready to send advertisement contents provided by the advertiser to customers. When a QR code is received from the customer terminal in step S504, the server transmits the advertisement contents and a quiz to the customer terminal in step s506. When an answer to the quiz is received from the customer terminal in step S508, the server determines whether the answer is correct, in step S512. When the answer is not correct, the server transmits a message saying "Solve a quiz again" to the customer terminal, such that the customer watches the advertisement contents again. On the other hand, when the answer is correct, the server performs a random draw, and notifies the draw result to the customer terminal, in step S514 and S516. The server transmits a pin number to the chosen customer terminal in step S518. After step S518, when an approval request is received from the sample processing terminal in step S520, the server checks a pin number or barcode transmitted from the sample processing terminal, and notifies an approval result to the sample processing terminal, in step S522. When counting is requested by the sample processing terminal after the sample is provided, the server performs sample receipt counting in step S524, and provides sample distribution information to the real-time monitoring unit of the app browser in step S526. Then, the process is ended.

FIG. 19 is a flowchart illustrating the process of the sample processing terminal. As illustrated in FIG. 19, when sample products are received from the advertiser in step S602, a manager downloads the manager app and executes the manager app through the sample processing terminal in step S604. Then, the manager inputs a pin number provided from the customer terminal or scans a barcode to transmit an approval request to the server, in steps S606 and S608. When an authentication result is received from the server in step S610, the manager provides a sample product to the customer, and clicks the count button, in steps S612 and S614. Then, the process is ended.

While various embodiments have been described above, it will be understood to those skilled in the art that the embodiments described are by way of example only. Accordingly, the disclosure described herein should not be limited based on the described embodiments.

The invention claimed is:

1. A system for receiving a promotional sample product, comprising:
a sample receiving relay server configured to receive sample product information and advertisement contents from an advertiser, provide the advertisement contents to a customer when a sample receipt request is received from the customer, generate an authentication key, provide the generated authentication key to the customer, and provide an authentication result to a sample receipt place according to a confirmation request for the authentication key, transmitted from the sample receipt place;
an advertiser terminal configured to connect to the sample receiving relay server to input the advertisement contents desired by the advertiser and information on the quantity of sample products;
a customer terminal configured to connect the customer terminal and the sample receiving relay server through a network, connect to the sample receiving relay server to download the advertisement contents for sample receipt, and receive an authentication key (pin number), which is used to authenticate whether the advertisement contents watched by the customer have been completely received, from the sample receiving relay server, and including a medium for generating an advertisement contents receipt completion authentication key; and
a sample processing terminal configured to transmit the authentication key provided from the customer terminal to the server, and including a manager app for receiving an authentication result transmitted from the server in order to provide a sample to the customer,
wherein the sample receipt app generates only one authentication key per customer ID, in order to prevent duplicated samples from being provided for one customer ID.

2. The system of claim 1, further comprising a GPS (Global Positioning System) connected to the customer terminal and configured to guide the location of a sample receipt place from the location of the customer terminal.

3. The system of claim 1, wherein the sample receipt app is a sample receipt app in which a QR reader, a barcode reader, a video player, an image viewer and a member registration input unit are mounted.

4. The system of claim 1, wherein the sample receipt app comprises:
a digital recognition module configured to read information associated with a product promoted by the advertiser;
a received advertisement sorting unit configured to display advertisements received by the customer;
a pin number generation unit configured to generate a pin number as the customer checks the advertisement contents;
a promotion location notice unit configured to provide the location of a sample providing place around the location of the customer; and
a sample providing place module configured to provide the location of a place where the customer receives a sample product.

5. The system of claim 4, wherein the digital recognition module is any one selected from a QR code scanner, a QR code reader, a barcode scanner and a barcode reader.

6. The system of claim 4, wherein the promotion location notice unit comprises:
a current location notice unit configured to display the current location of the customer; and
a sample place providing unit configured to provide the location of a place where the customer receives a sample,
wherein the sample place providing unit displays only sample receipt places located within a predetermined distance.

7. The system of claim 1, wherein the sample receiving relay server chooses a customer among customers who give the correct answer, through a draw, generates an authentication key only for the chosen customer, and provides the generated authentication key to the chosen customer.

8. The system of claim 1, wherein the sample receiving relay server comprises:
an advertisement request unit configured to receive a sample providing request for advertisement from the advertiser terminal;
a sample delivery unit connected to the advertisement request unit, and comprising a direct delivery unit which helps the advertiser to deliver samples in person and a consignment delivery unit which helps the advertiser to deliver samples through consignment delivery; and
a draw unit having a winning rate selection unit configured to select a customer winning rate for the samples provided by the advertiser.

9. The system of claim 8, wherein the advertisement request unit comprises a data upload unit configured to upload a sample product menu and an advertisement contents menu.

10. The system of claim 1, wherein the sample receiving relay server further comprises a customer information database configured to store information on customers who have downloaded the sample receipt app.

11. The system of claim 8, further comprising a real-time monitoring unit connected to the advertisement request unit and configured to display a situation, in which the sample is received, to the advertiser in real time.

12. The system of claim 11, wherein the real-time monitoring unit provides only authentication key confirmation information to the advertiser.

13. The system of claim 8, wherein the consignment delivery unit of the sample delivery unit comprises:

a sample providing place registration unit configured to guide the location of a place for providing a sample product;

a sample price range unit configured to classify the prices of samples such that the advertiser selects a sample price;

a sample display unit connected to the sample price range unit, and configured to display samples for each price range to the advertiser;

a sample selection unit connected to the sample display unit and configured to select and designate a sample; and a payment unit connected to the sample selection unit, and configured to calculate the quantity of samples selected by the advertiser, and display the calculation result.

14. The system of claim 11, wherein the real-time monitoring unit comprises a distribution completion unit and a distribution progress unit, and the distribution completion unit comprises a sample addition unit configured to inform the advertiser of whether samples are added.

15. The system of claim 14, wherein the distribution completion unit further comprises an excel information unit configured to display the IDs and names of customers who receive sample products.

16. The system of claim 1, wherein the manager app of the sample processing terminal comprises:

a sample list to be provided to the customer;

a barcode scanner configured to receive a barcode offered by the customer;

a manual input unit configured to input the barcode offered by the customer, when the barcode is not normally recognized;

a provided sample list for checking samples which have been provided to the customer up to now; and a sample-to-provide list for checking samples which are to be provided to the customer in the future.

17. The system of claim 16, wherein the sample list comprises an overall quantity menu, a provided quantity menu and a stock quantity menu for each of the sample products.

18. The system of claim 16, wherein the barcode scanner includes a sample name, a customer ID and a pin number which are displayed as texts, wherein the manual input unit receives an advertisement ID, a customer ID and a pin number.

19. The system of claim 16, wherein the provided sample list comprises a customer ID and a receipt date.

20. The system of claim 16, wherein the sample-to-provide list comprises a sample selection unit and a customer ID and pin number for each sample list, selected by the sample selection unit.

21. A method for receiving a promotional sample product, comprising:

a first step of connecting, by an advertiser terminal, to an advertisement request unit and requesting advertisement, in order to provide a promotional sample;

a second step of uploading information associated with the advertisement into a sample product menu and an advertisement contents menu, which are included in the advertisement request unit;

a third step of depositing a preset amount of money according to the quantity of samples to be provided;

a fourth step of downloading, by a customer terminal, a sample receipt app which includes a QR code recognition module for reading information of a product, a received advertisement sorting unit for displaying advertisements received by a customer, an authentication key generation unit for generating an authentication key as the customer checks advertisement contents, a promotion location notice unit for providing a promotion location around the location of the customer, and a sample receipt place program for providing the location of a place where the customer receives a sample product;

a fifth step of executing, by the customer terminal, the sample receipt app, scanning a digital recognition code printed on a product, and transmitting the digital recognition code to a sample receiving relay server;

a sixth step of providing, by the sample receiving relay server, advertisement contents to the customer terminal, and inducing the customer to watch the advertisement contents;

a seventh step of receiving an authentication key from the sample receiving relay server after the advertisement contents are displayed, generating a digital recognition code, and providing the generated digital recognition code to the customer terminal;

an eighth step of offering the authentication key and the digital recognition code, provided to the customer terminal, to a sample processing terminal;

a ninth step of downloading, by the sample processing terminal, a manager app which includes a sample list to be provided to the customer, a barcode scanner for receiving a barcode offered by the customer, a manual input unit for inputting the barcode offered by the customer when the barcode is not normally recognized, a provided sample list for checking samples which have been provided up to now, and a sample-to-provide list for checking samples to be provided to the customer in the future;

a tenth step of executing the manager app of the sample processing terminal to read the authentication key and the digital recognition code, offered by the customer, and transmitting the authentication key and the digital recognition code to the sample receiving relay server; and an 11th step of providing a sample product to the customer according to an authentication result transmitted from the sample receiving relay server, wherein the authentication key is allocated to only one ID.

22. The method of claim 21, wherein the second step comprises:

a first process of selecting one of a direct delivery method and a consignment delivery method in order to deliver sample products;

a second process of setting a sample providing place, and selecting a sample product for each price range and the quantity of sample products, when the consignment delivery method is selected;

a third process of displaying a sample product corresponding to the sample price range;

a fourth process of selecting and designating a sample product and deciding the quantity of sample products; and a fifth process of depositing an amount of money corresponding to the quantity of sample products.

23. The method of claim 21, further comprising a process of selecting a winning rate such that the customer receives a sample product according to a probability, after the second step.

24. The method of claim 21, wherein the seventh step further comprises a step of providing a quiz to the customer after the advertisement contents are completely received, inducing the customer to solve the quiz, choosing a customer among customers who give the correct answer, through a draw, generating an authentication key only for the chosen customer, and providing the authentication key to the chosen customer.

25. The method of claim 21, further comprising a 12th step of transmitting a sample receipt result to the advertiser terminal in real time, after the 11th step.

26. The method of claim 25, wherein the 12th step comprises:
 a first process of determining whether the samples have been completely distributed or are being distributed, and deciding whether to additionally provide samples, when the samples have been completely distributed; and
 a second process of setting the quantity of the samples when the samples are additionally provided, and depositing an amount of money according to the quantity of the samples.

27. The method of claim 21, further comprising a 13th step of propagating sample information to the customer through a notice when the customer is located around a sample receipt place or new sample product information is propagated to the customer, wherein the notice displays an advertisement title, a sample product name, a distance from the current location of the customer to the sample providing place, and a winning probability.

28. A method for receiving a promotional sample product, comprising:
 a first step of connecting, by an advertiser terminal, to an advertisement request unit in order to provide a promotional sample;
 a second step of uploading information associated with the advertisement into a sample product menu and an advertisement contents menu, which are included in the advertisement request unit;
 a third step of depositing a preset amount of money according to the quantity of samples to be provided;
 a fourth step of connecting to a server through a sample receipt app of a customer terminal, and connecting to a menu for receiving a sample;
 a fifth step of determining whether a customer is willing to watch advertisement contents, and displaying the advertisement contents;
 a sixth step of requesting the server to receive a sample, after the customer watches the advertisement contents;
 a seventh step of receiving an authentication key for sample receipt from the server through the sample receipt app, and generating a digital authentication code and providing the generated digital authentication code to the customer terminal;
 an eighth step of downloading, by a sample processing terminal, a manager app, receiving authentication information provided from the customer, and transmitting the received authentication information to the server; and
 a ninth step of providing a sample product to the customer according to an authentication result,
 wherein a pin number is allocated only to one ID.

* * * * *